United States Patent
Sasaki

(10) Patent No.: US 6,557,241 B1
(45) Date of Patent: May 6, 2003

(54) METHOD OF MANUFACTURING COMBINATION TYPE THIN FILM MAGNETIC HEAD AND WAFER FOR USE THEREFOR

(75) Inventor: Yoshitaka Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/511,713

(22) Filed: Feb. 23, 2000

(30) Foreign Application Priority Data

Feb. 26, 1999 (JP) .......................................... 11-051072

(51) Int. Cl.[7] .......................... G11B 5/127; H04R 31/00
(52) U.S. Cl. ................. 29/603.12; 29/603.09; 29/603.1; 29/603.14; 29/603.15; 29/603.23; 451/8; 451/5; 360/126; 360/317
(58) Field of Search ...................... 29/603.07, 603.09, 29/603.1, 603.12, 603.14, 603.15, 603.16, 603.23, 603.24; 451/1, 5, 8, 28; 360/317, 126, 313, 318

(56) References Cited

U.S. PATENT DOCUMENTS

| | | | |
|---|---|---|---|
| 4,155,106 A | * | 5/1979 | Muraoka et al. .......... 451/28 X |
| 4,689,877 A | | 9/1987 | Church |
| 5,065,483 A | | 11/1991 | Zammit |

FOREIGN PATENT DOCUMENTS

| | | |
|---|---|---|
| JP | A-63-29315 | 2/1988 |
| JP | A-4-360008 | 12/1992 |

* cited by examiner

Primary Examiner—A. Dexter Tugbang
(74) Attorney, Agent, or Firm—Oliff & Berridge, PLC

(57) ABSTRACT

A process of forming a combination-type thin film magnetic head on a wafer is disclosed wherein plural polished amount-monitoring elements are formed at the same time as formation of the members which constitute the inductive-type thin film magnetic head. The plural polished amount-monitoring elements each have a different distance from the inside edge opposite to he air bearing surface of the joined surface between a pair of electrode members to the standard position of the zero-throat height. After the magneto-resistive-effective-type thin film magnetic head is formed, the wafer is cut into plural bars, each having plural arranged combination type thin film magnetic head units. Then ends of the bar are polished while monitoring the polished amount of the air bearing surface, by measuring the continuation and discontinuation between the electrode members of the polished amount-monitoring element formed on each bar, the ends of the bars are polished with monitoring the polished amounts of the air bearing surfaces to form plural combination type thin film magnetic head units having desired Throat Heights. Lastly, each bar is cut into plural combination type thin film magnetic head. The polish of the air bearing surface can be controlled in submicron order and thereby, the thin film magnetic head having a high surface recording density and little deterioration of reproducing output can be manufactured in a high yield process.

6 Claims, 37 Drawing Sheets

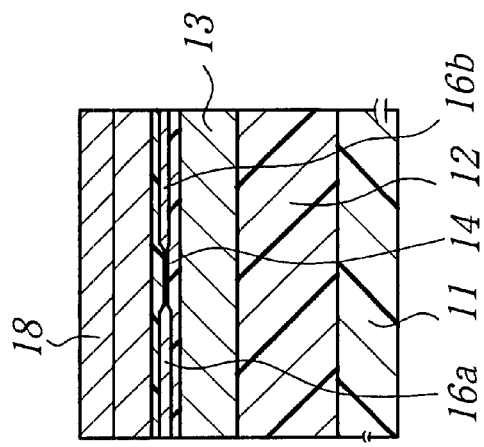
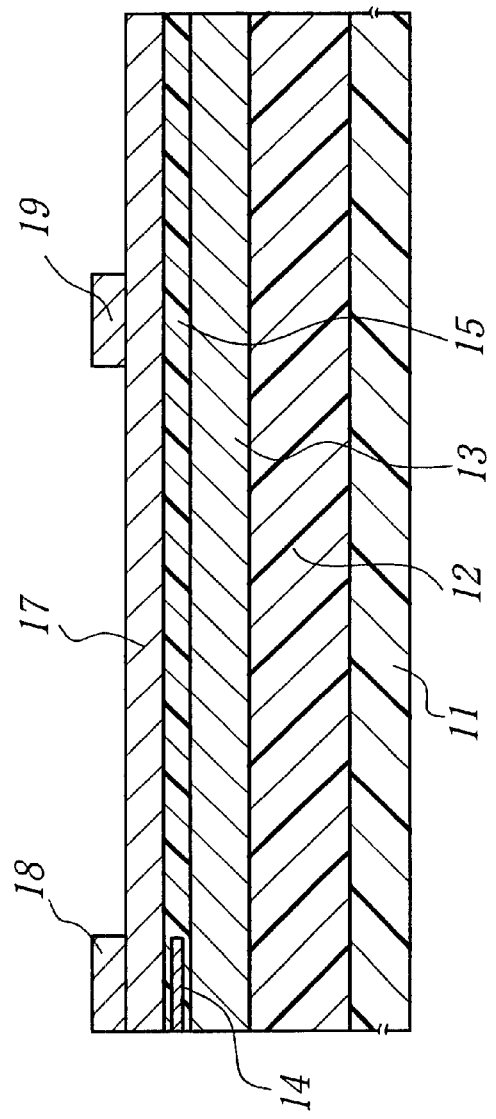
FIG. 14B
FIG. 14A

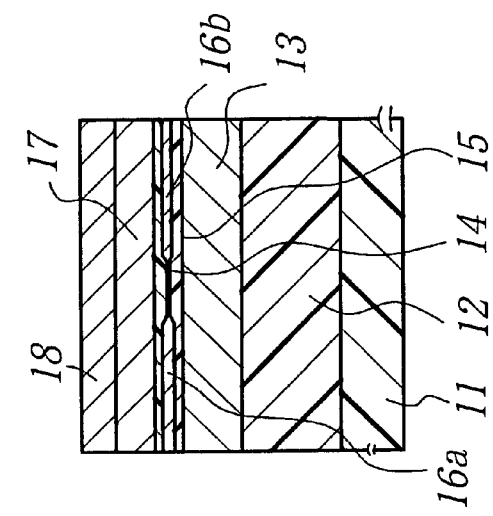
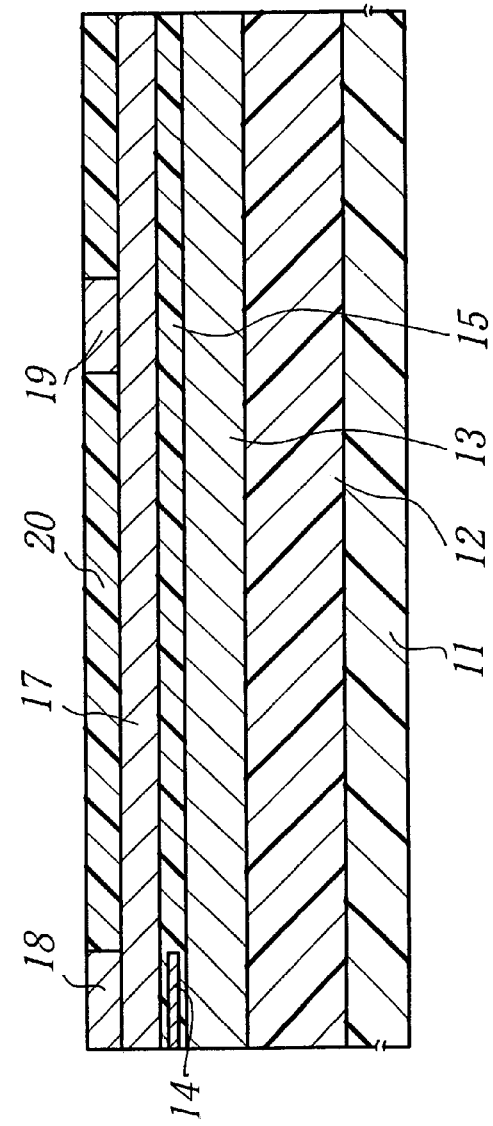

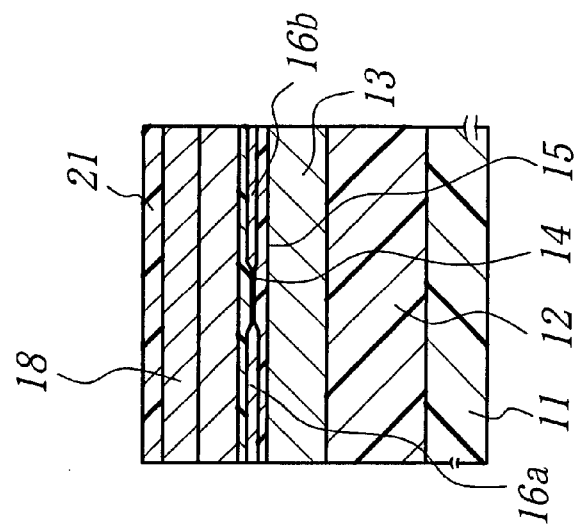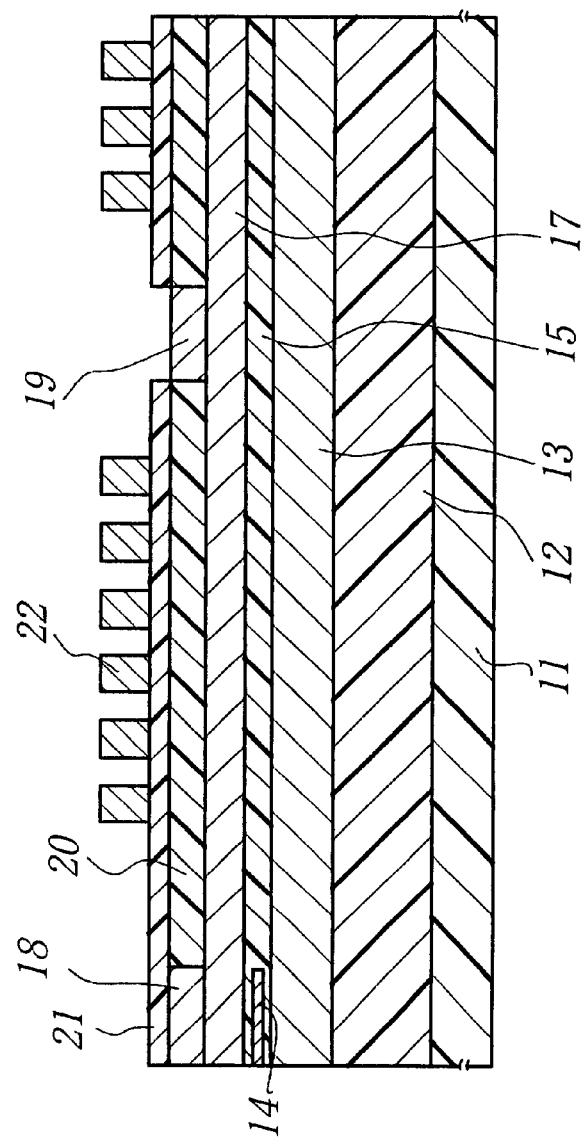

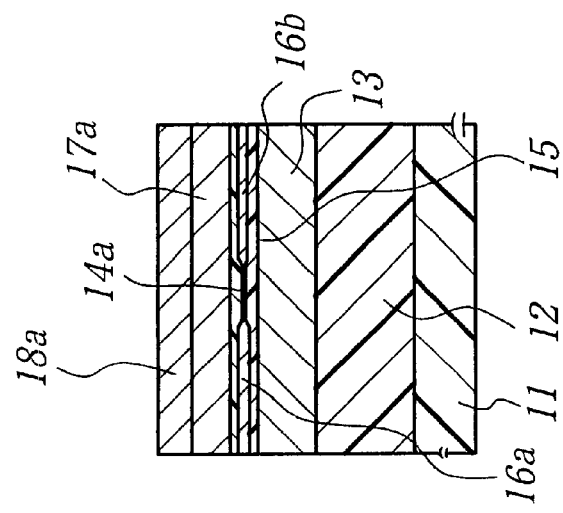
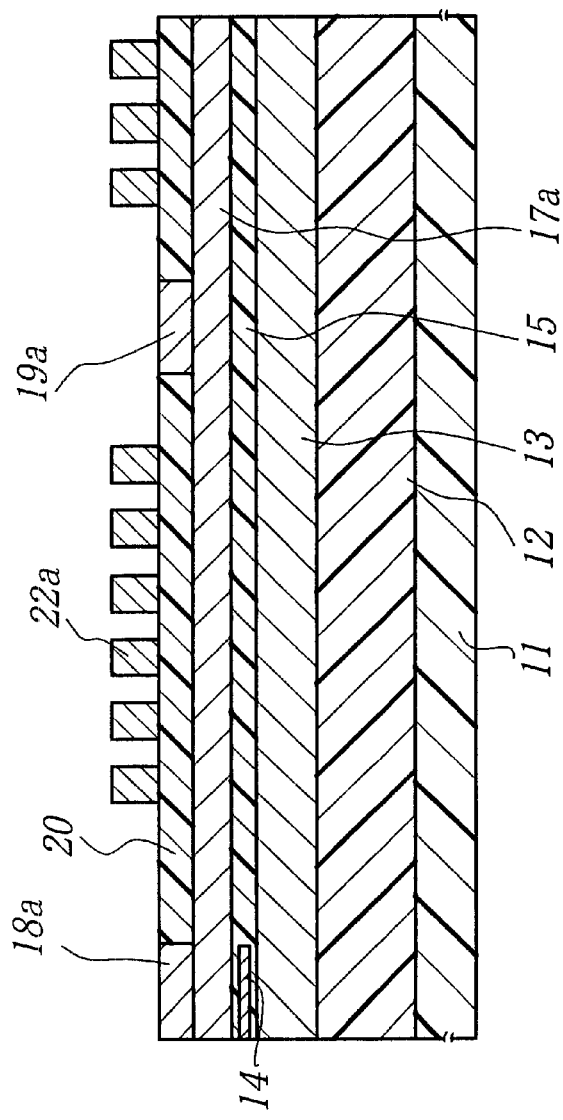

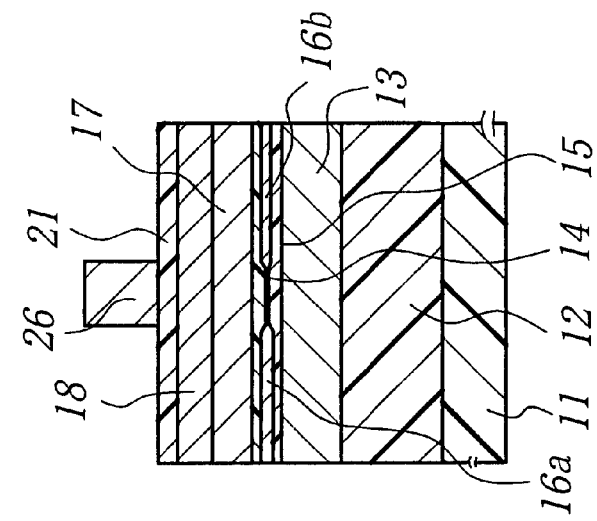
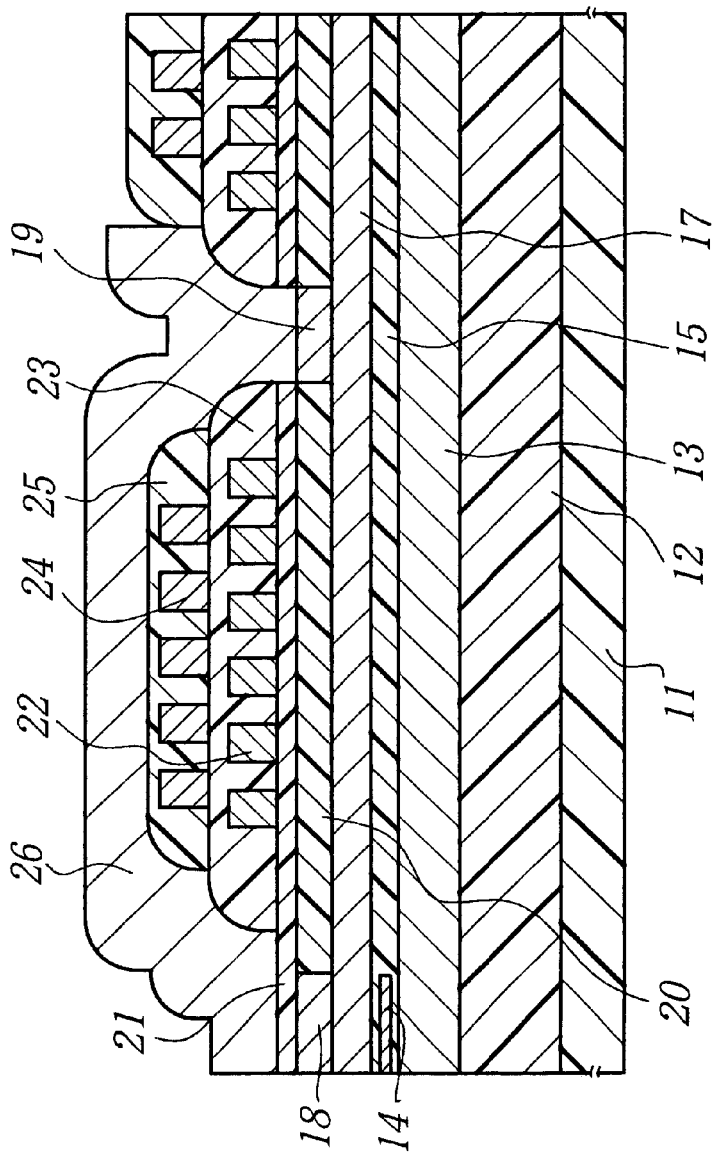

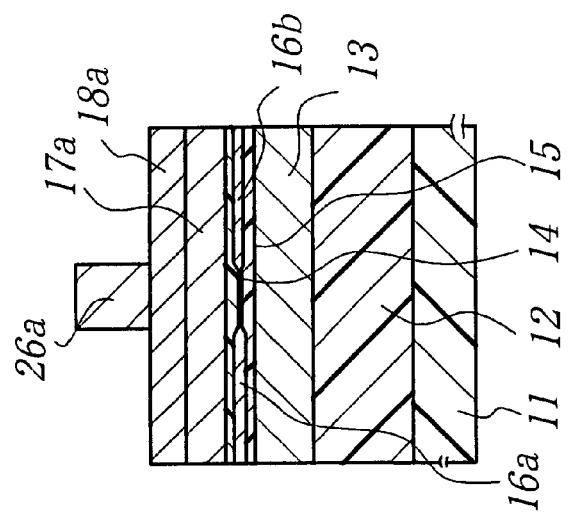
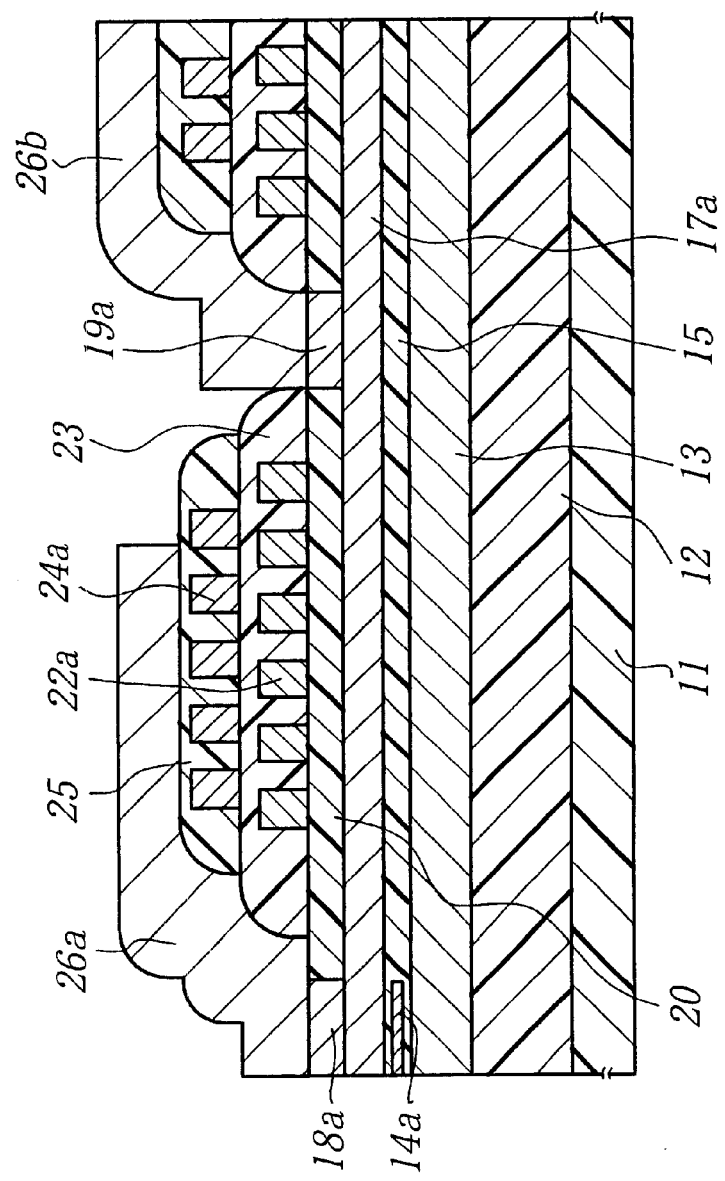
FIG. 19A
FIG. 19B

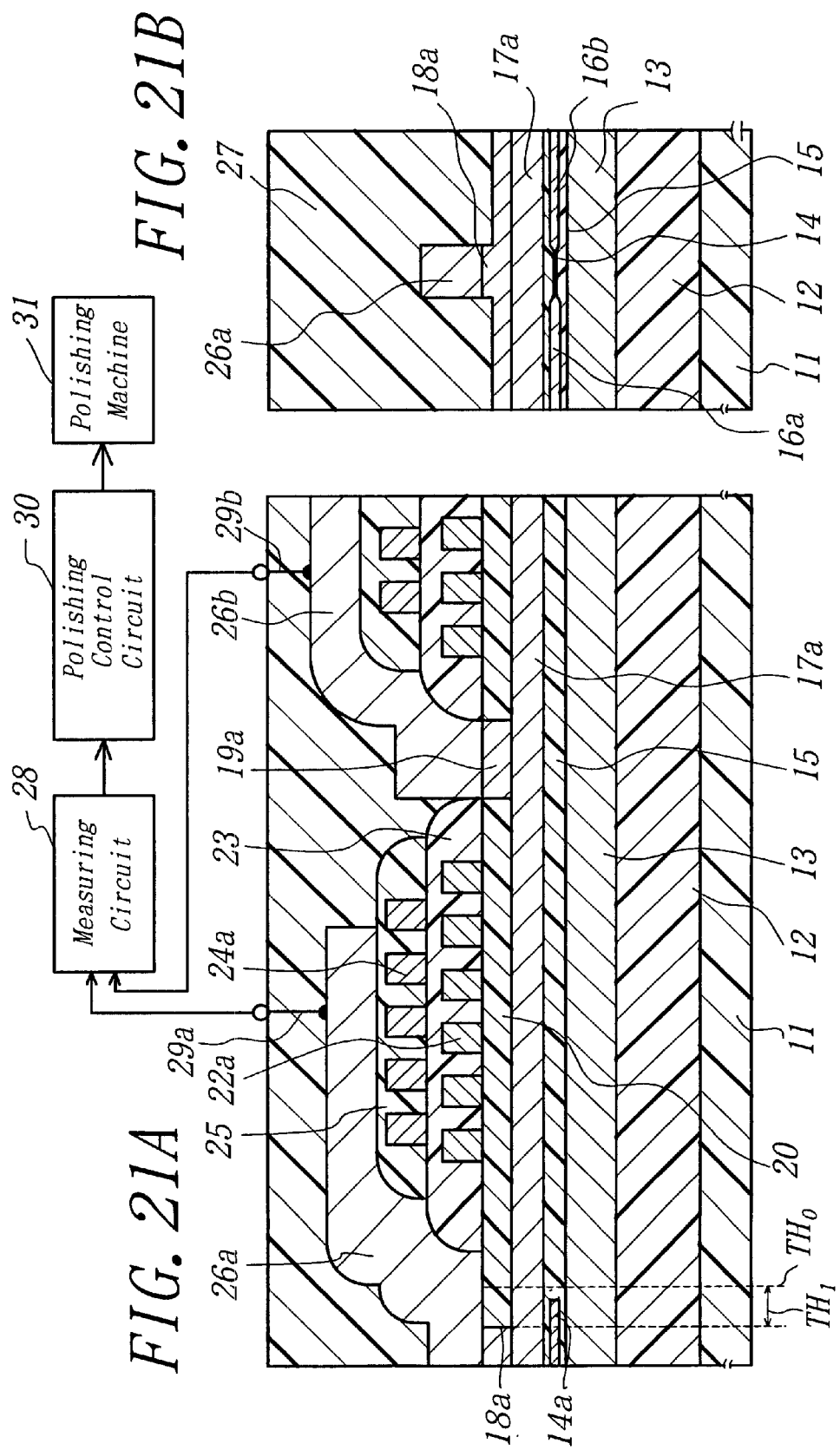

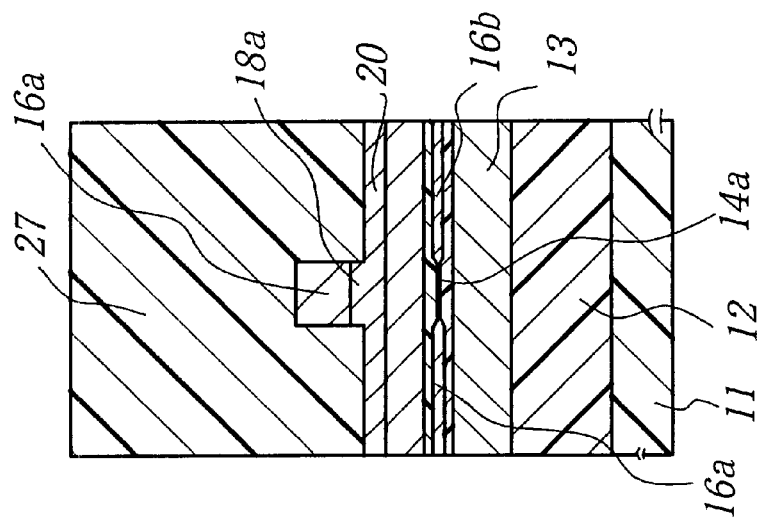
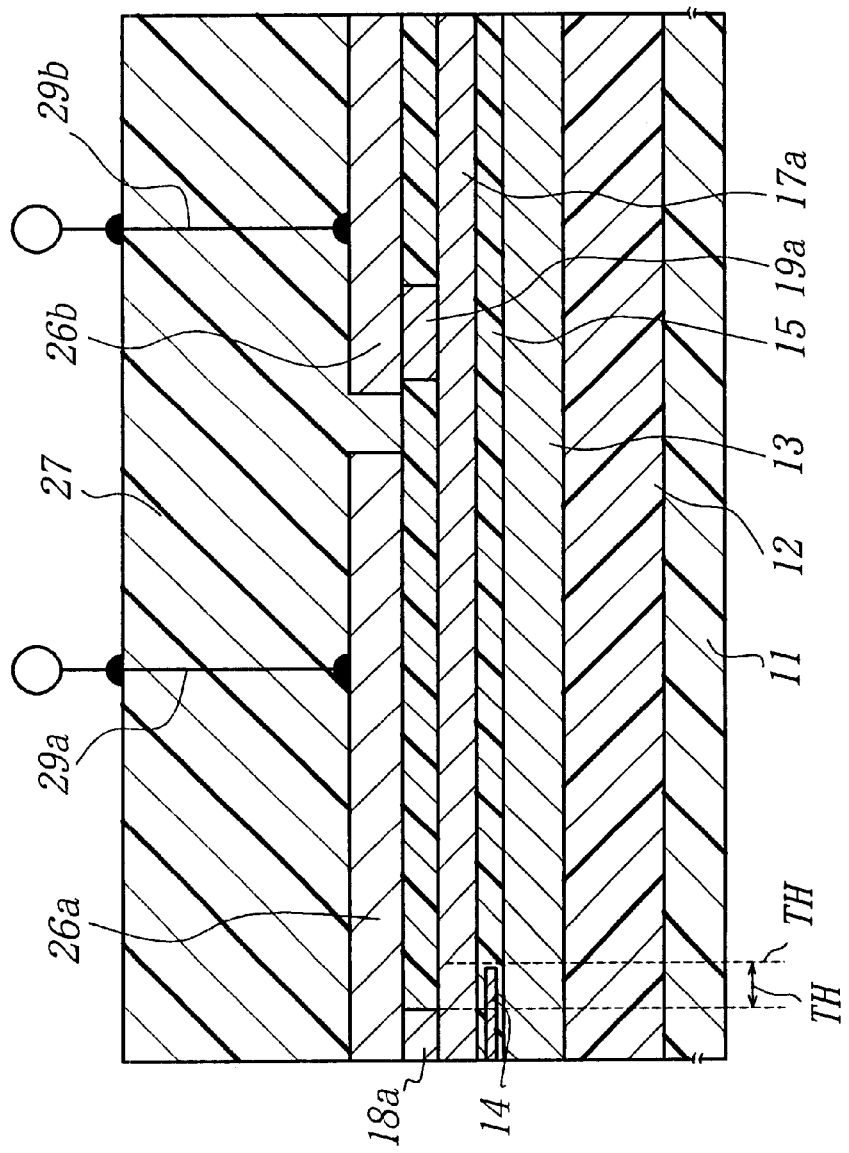

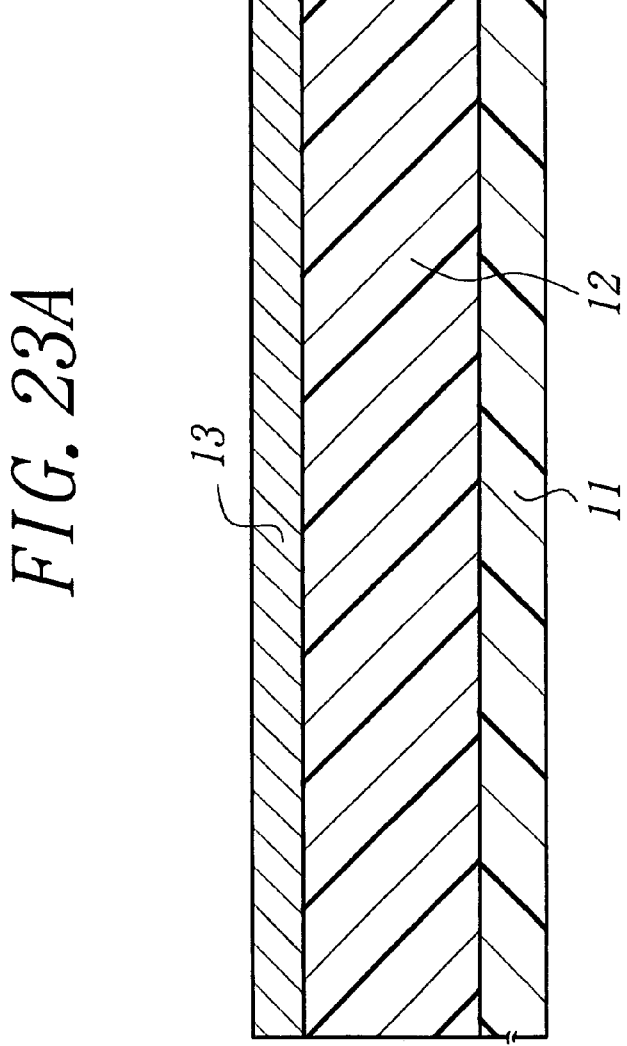

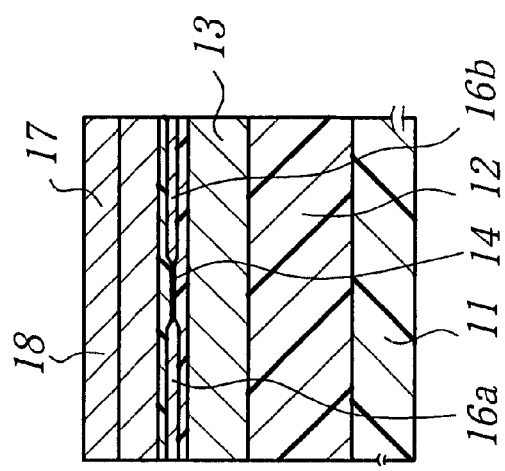
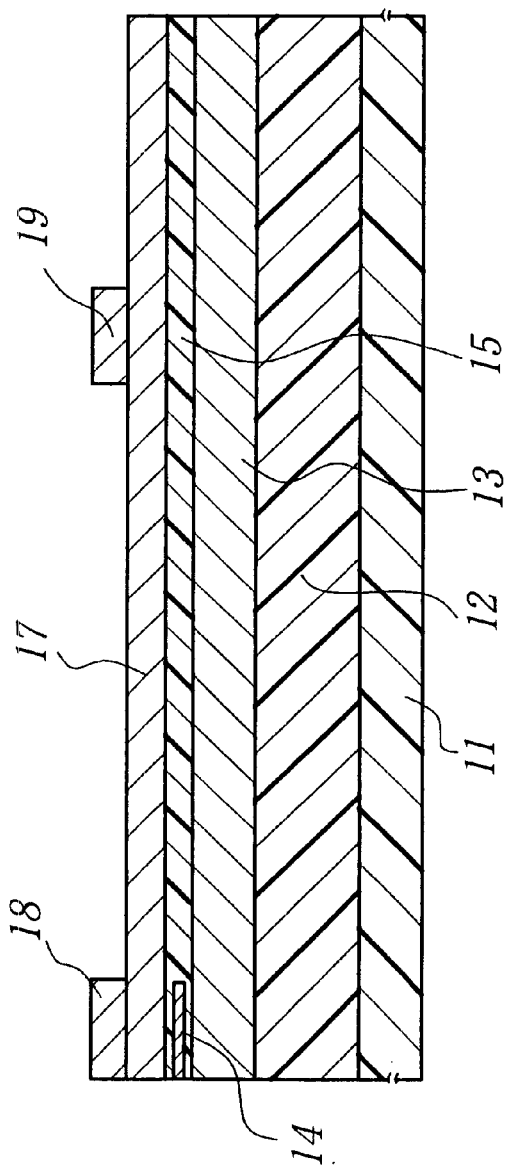
FIG. 24A
FIG. 24B

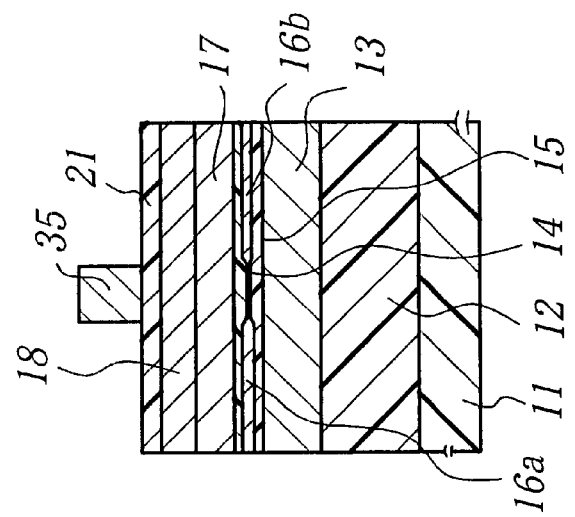
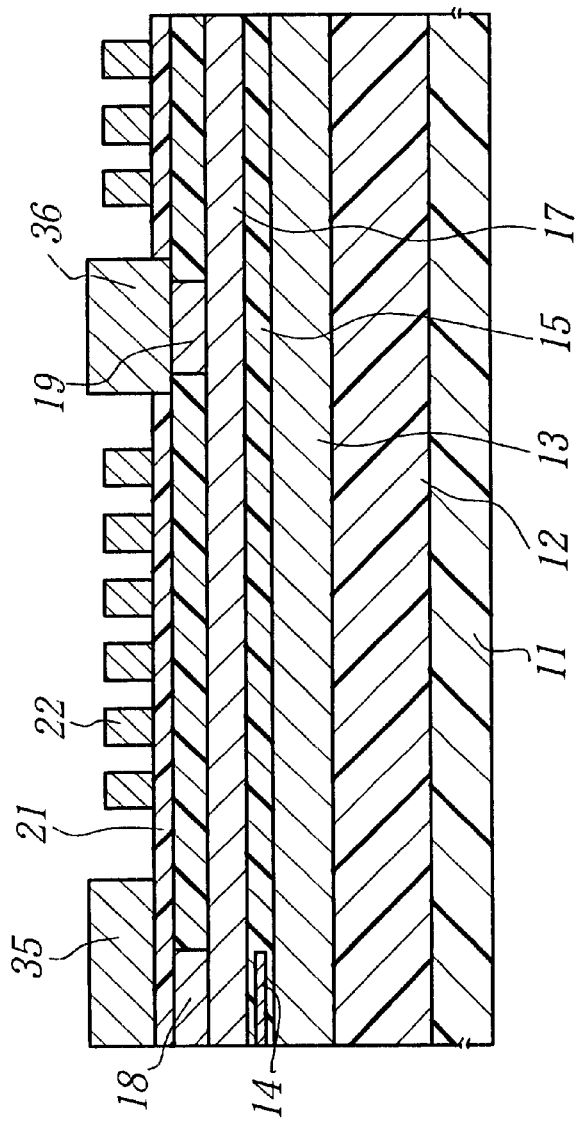

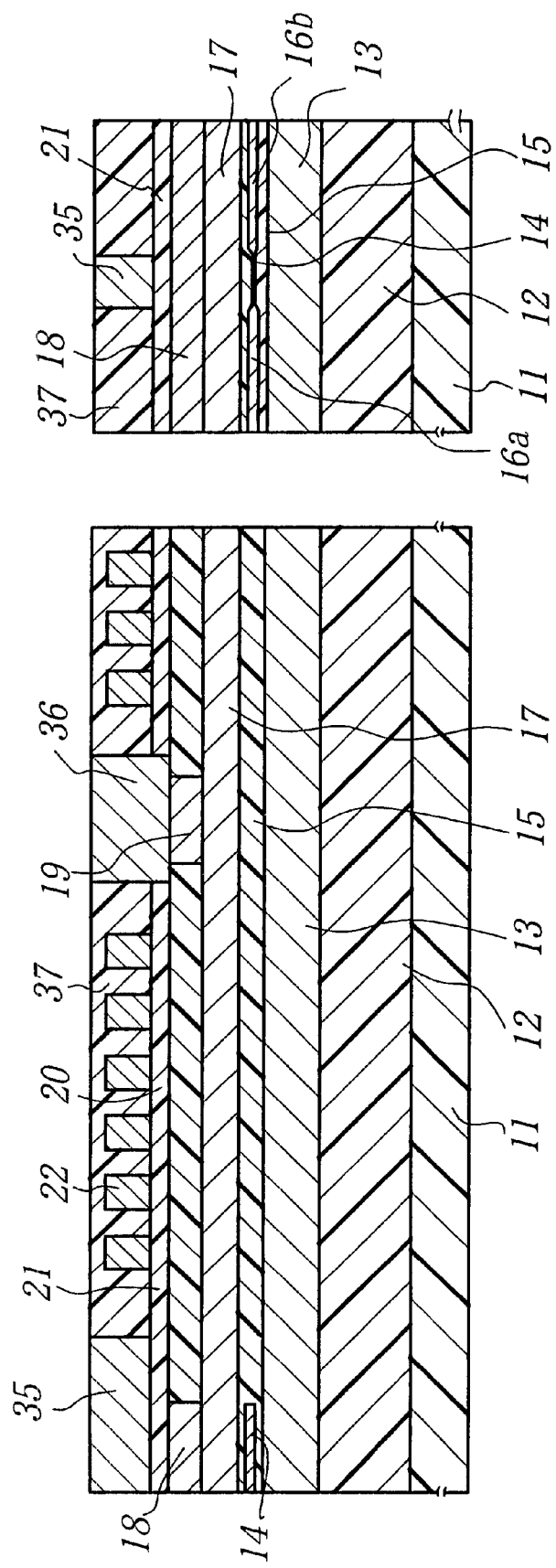

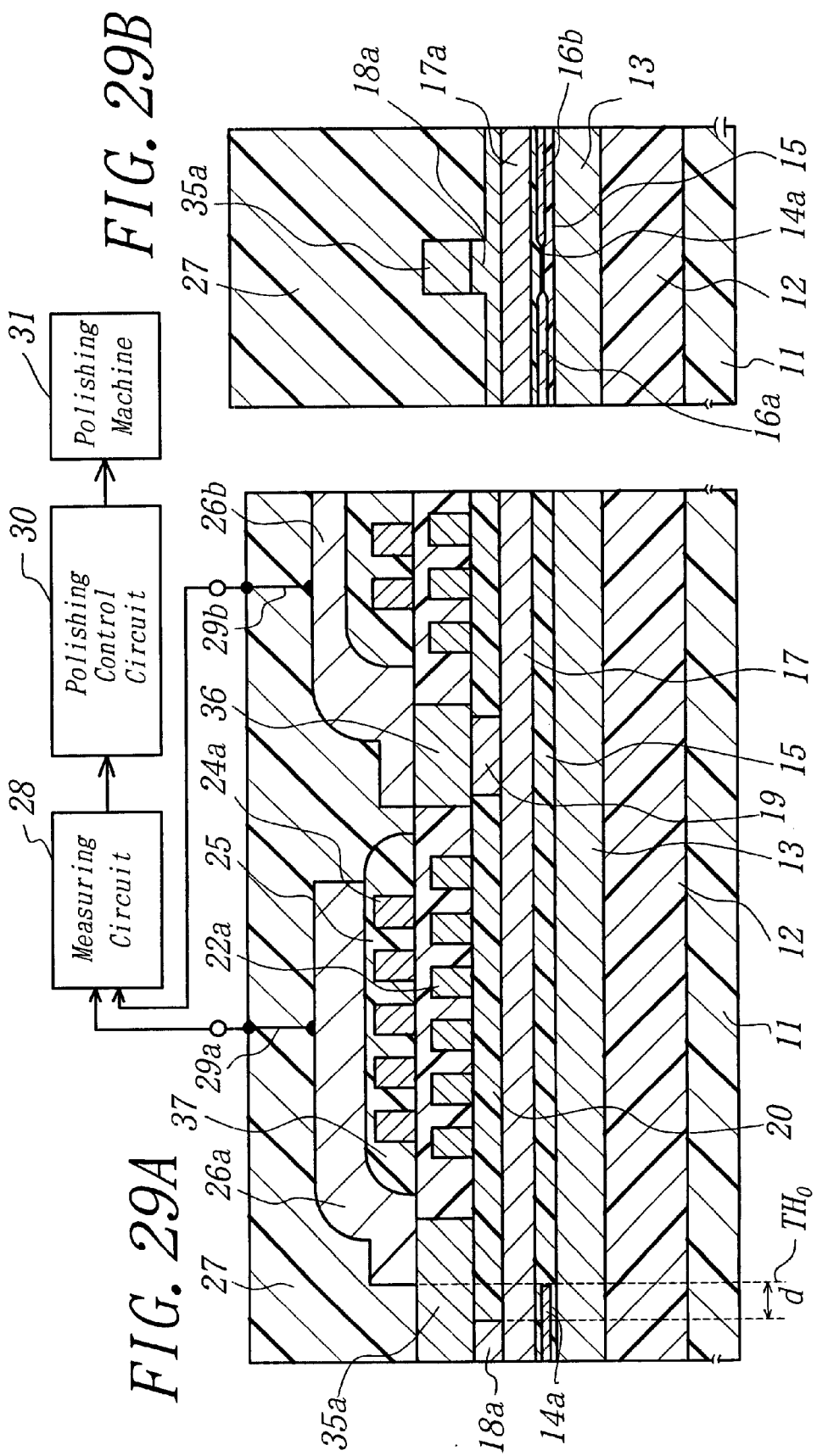

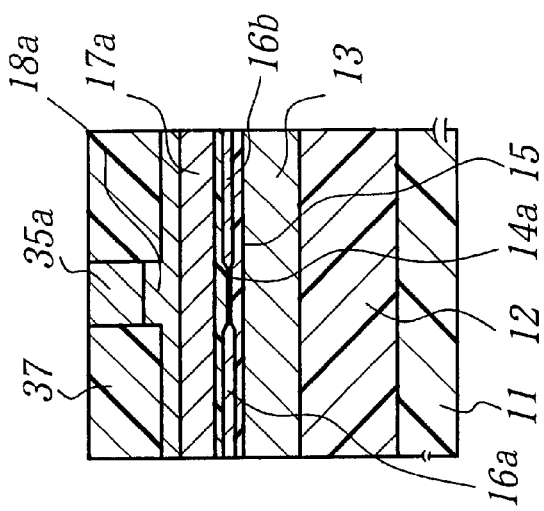
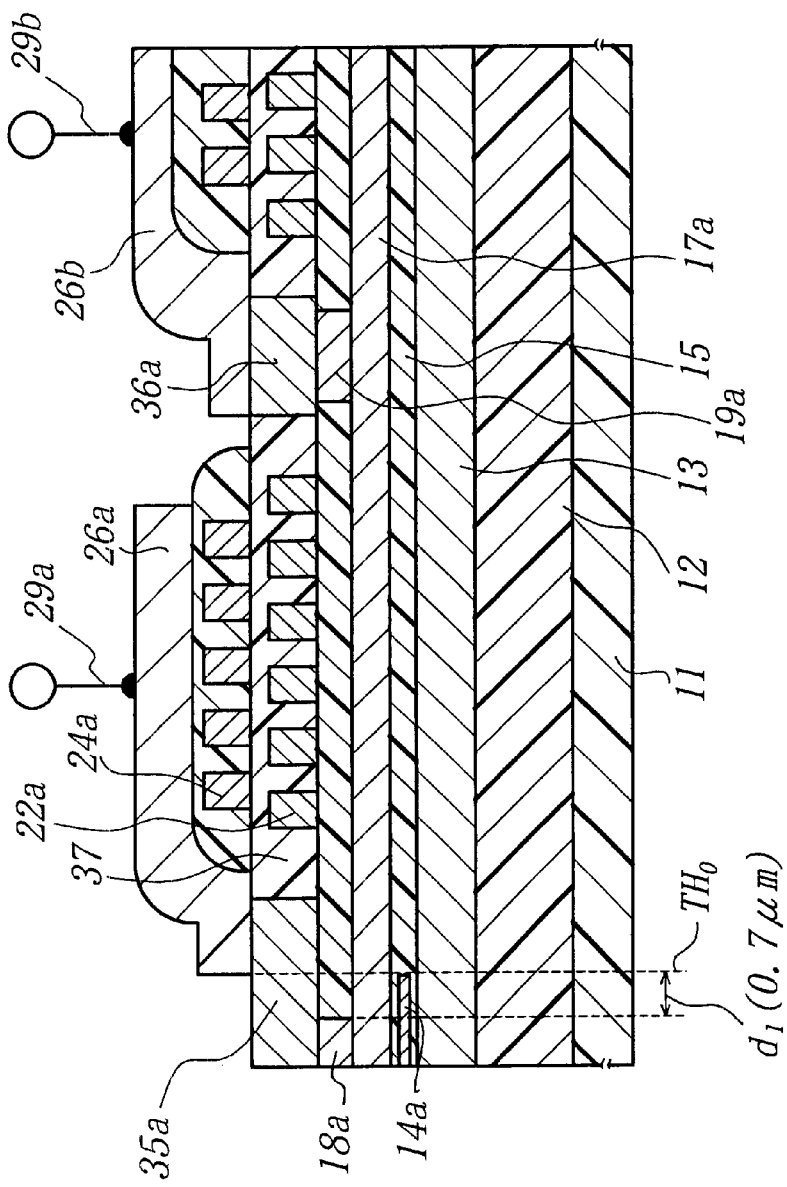

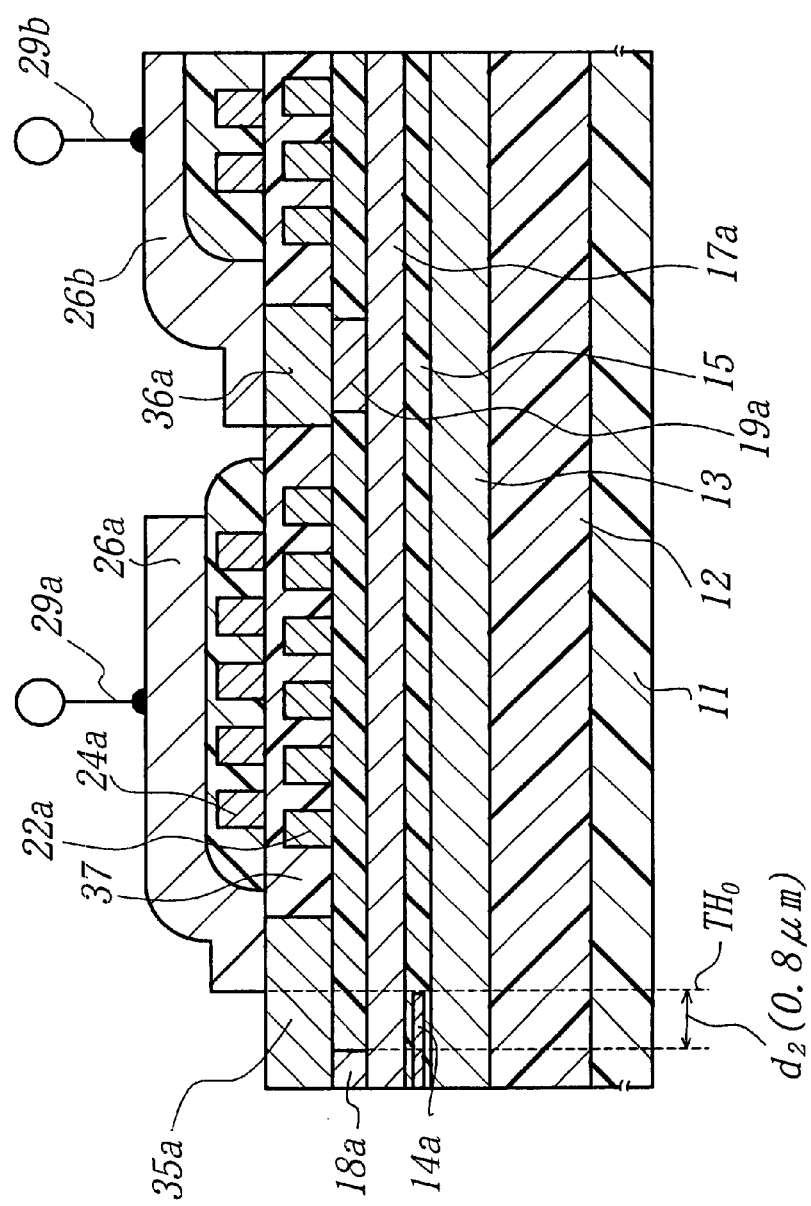

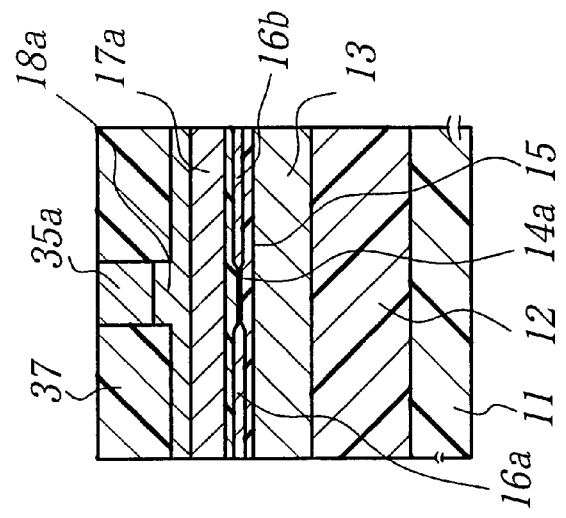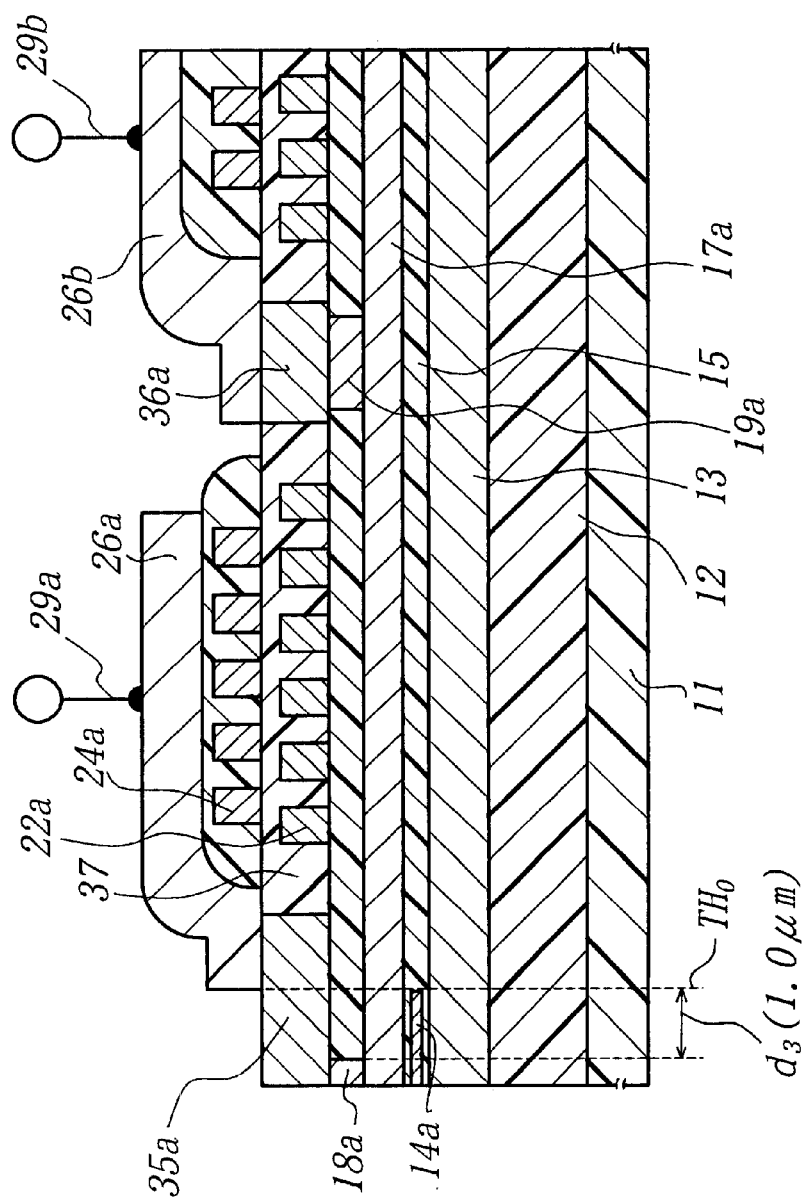

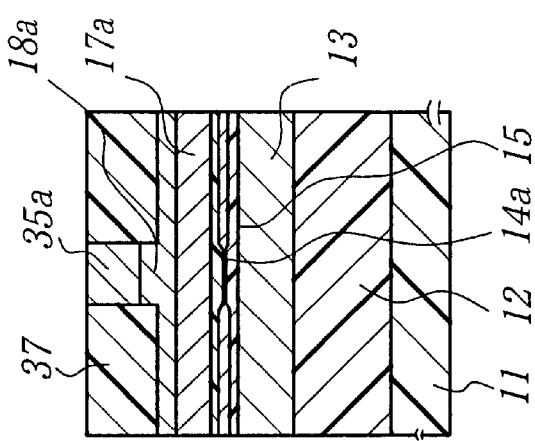
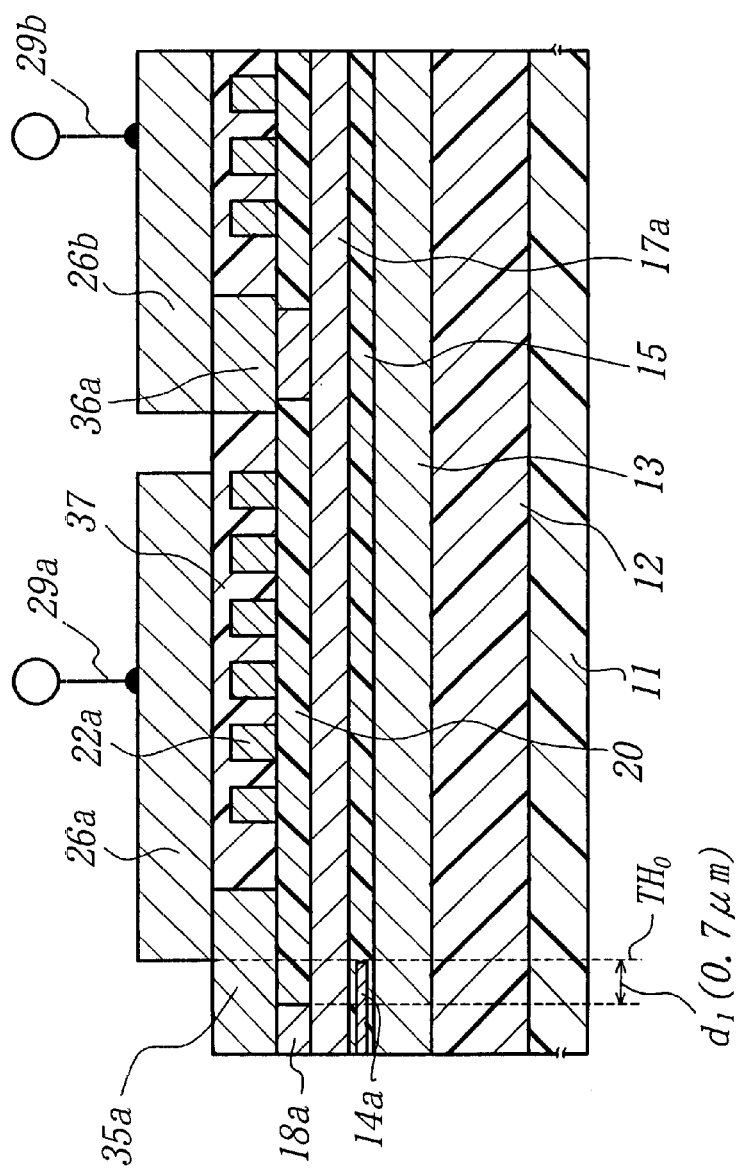

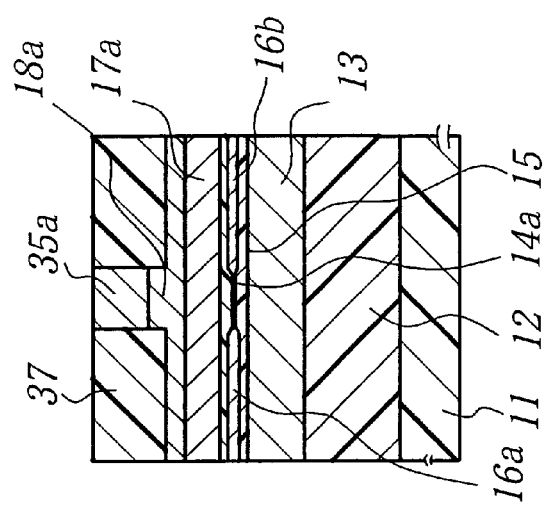
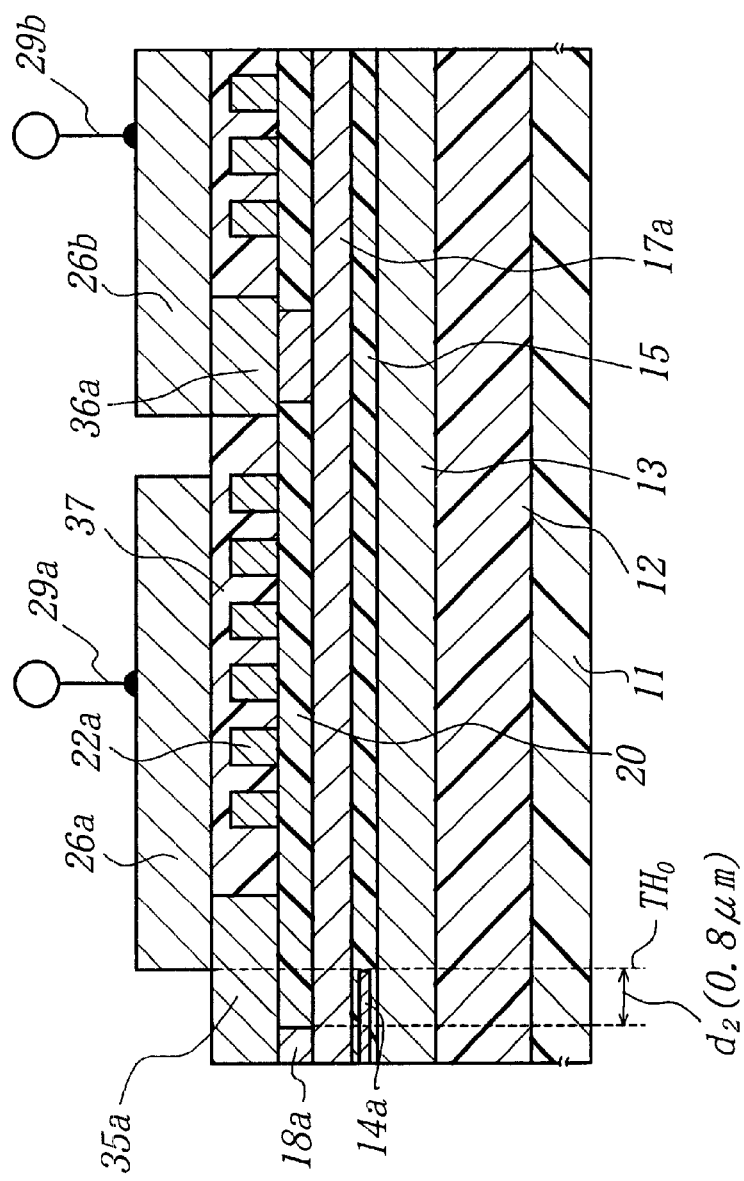

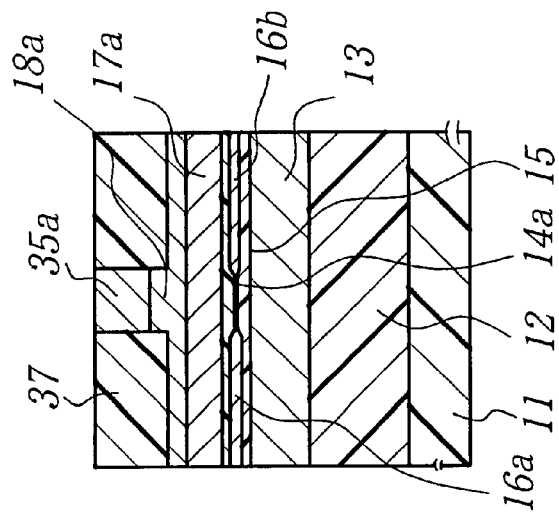
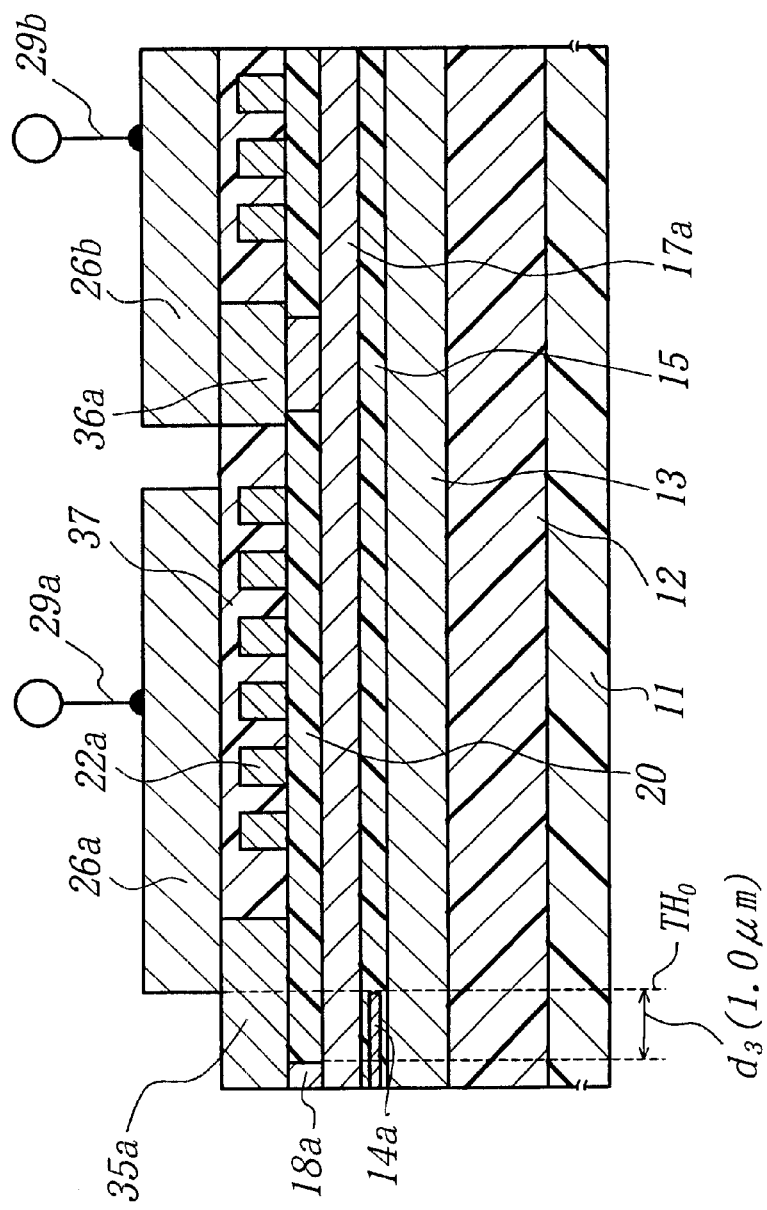

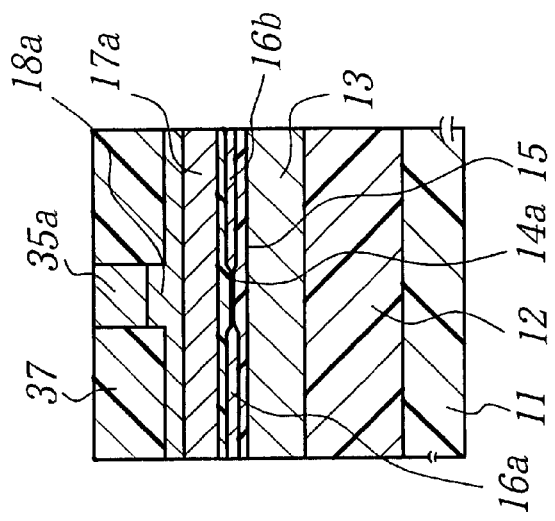
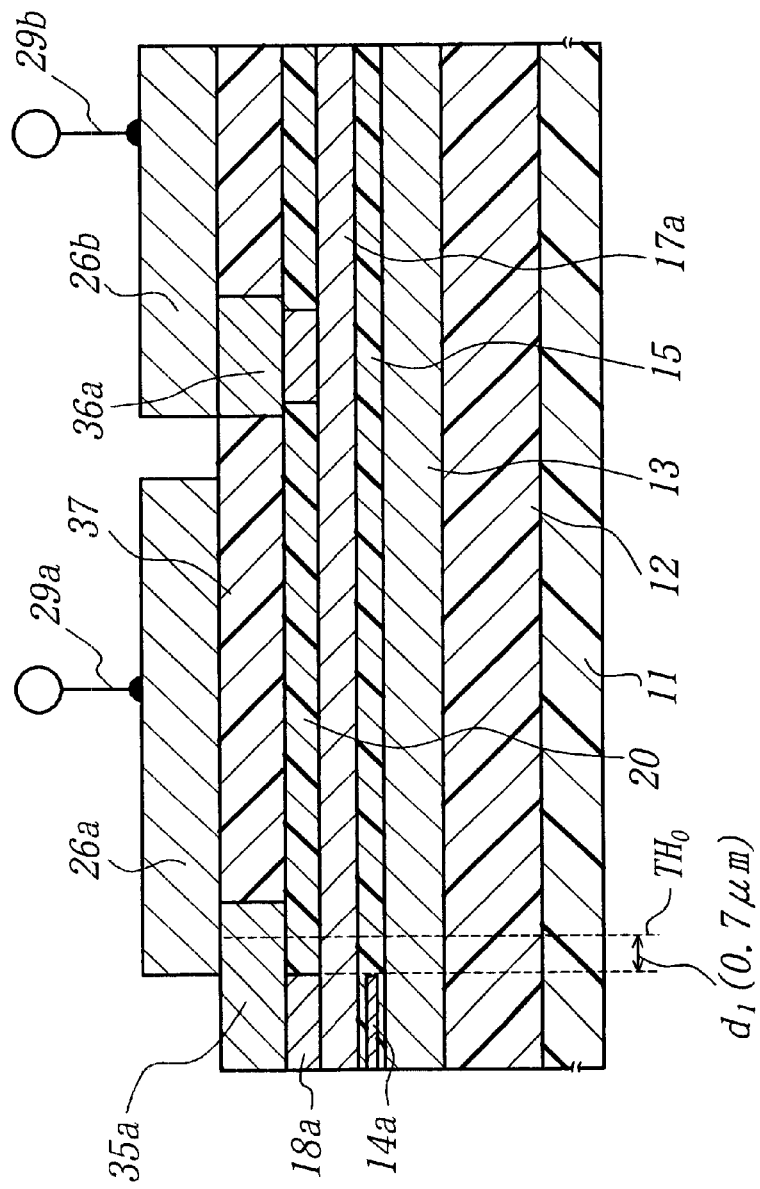

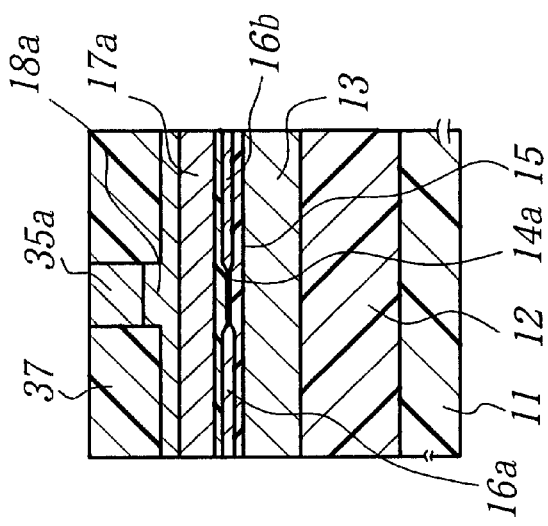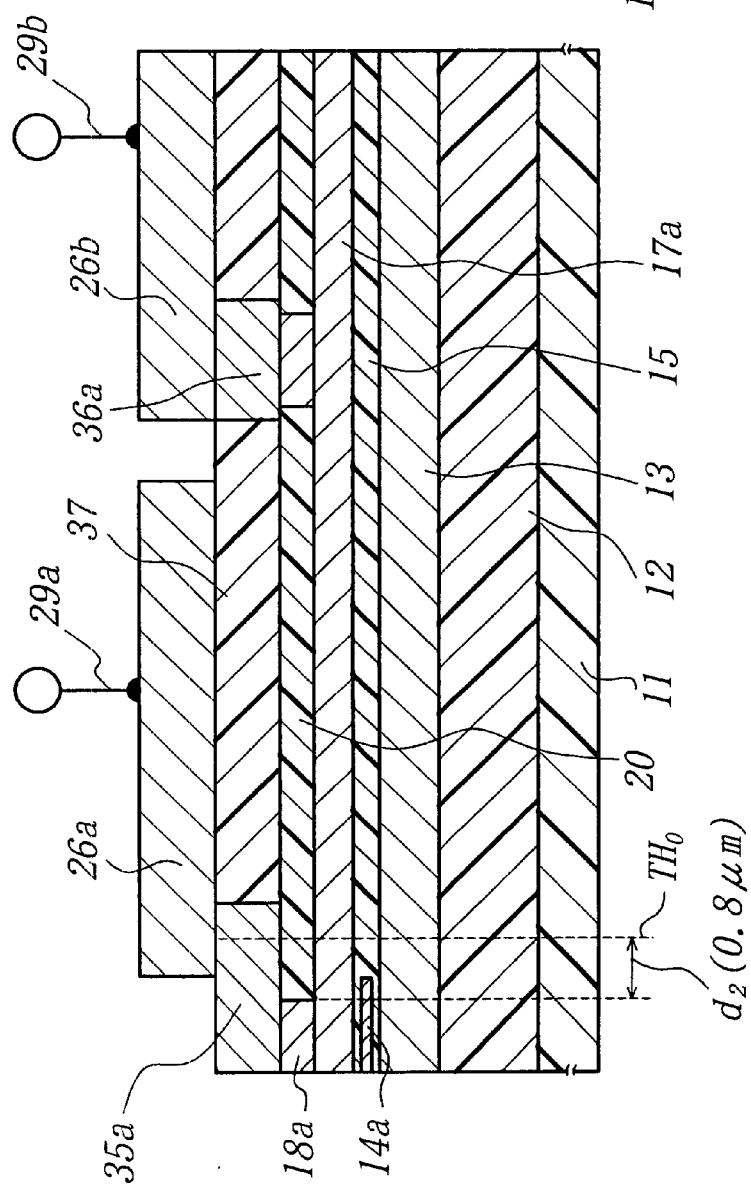

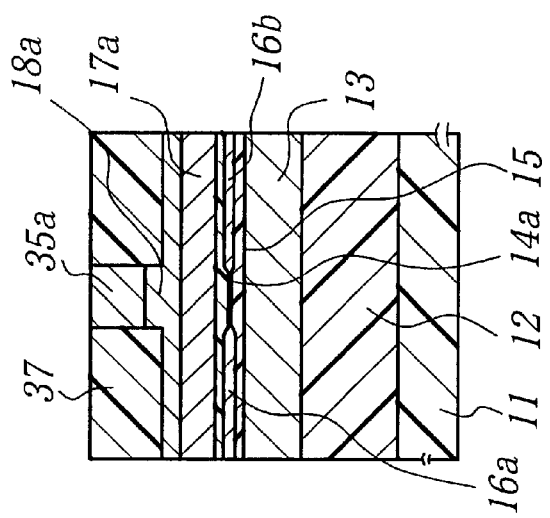
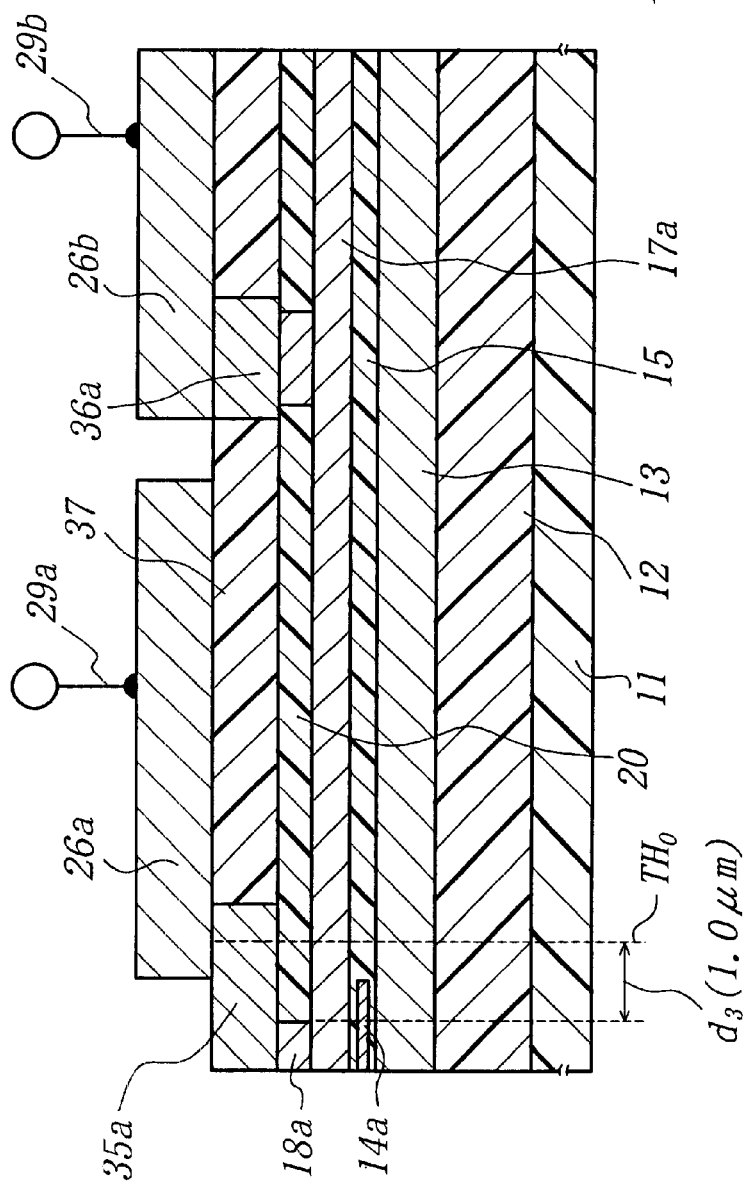

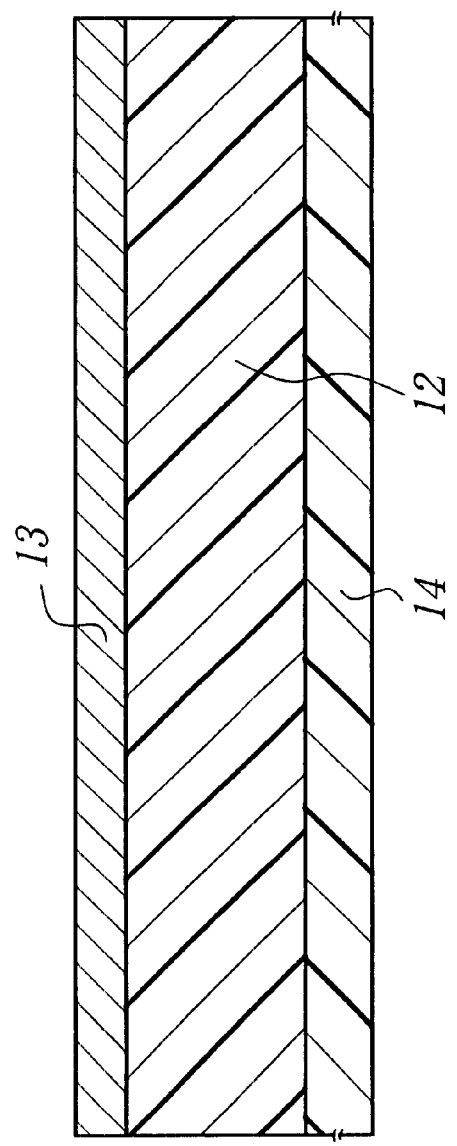
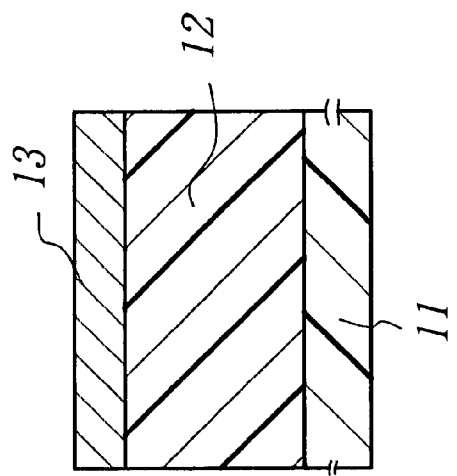
FIG. 40A
FIG. 40B

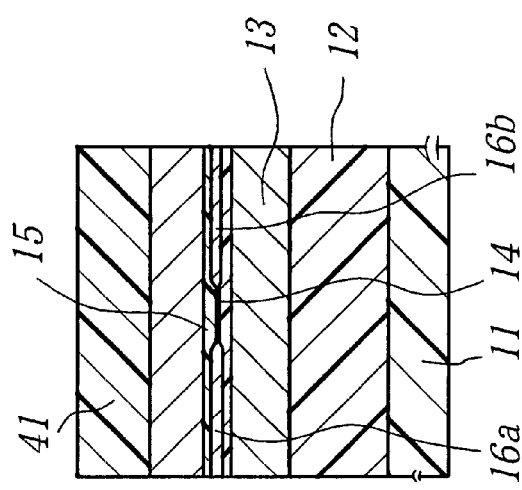
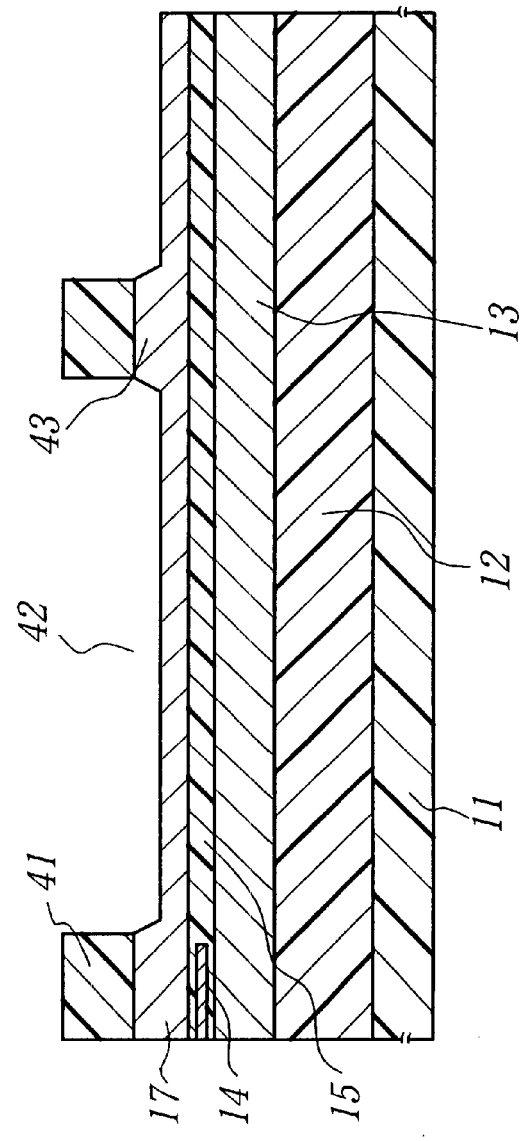

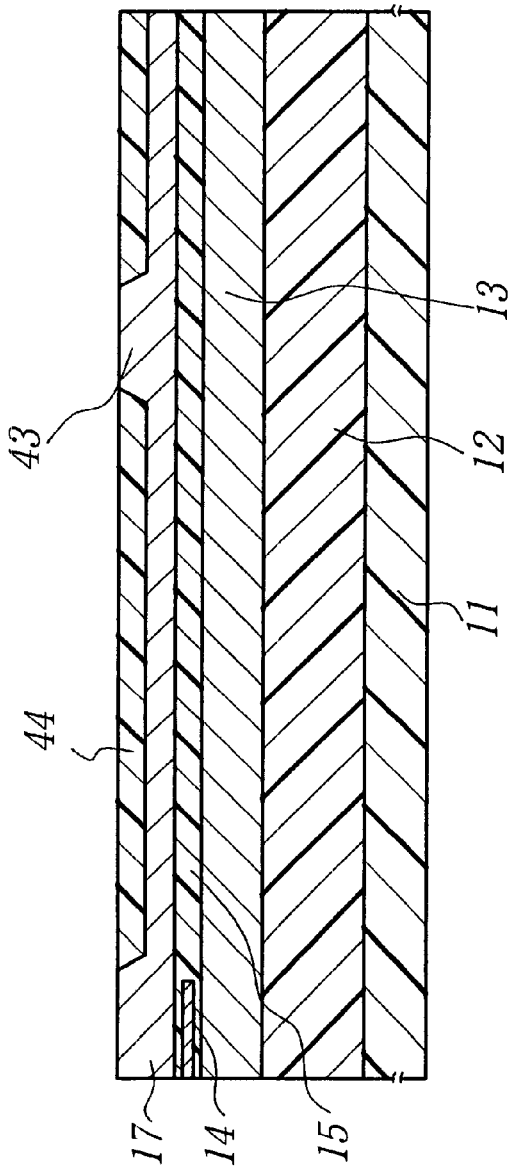
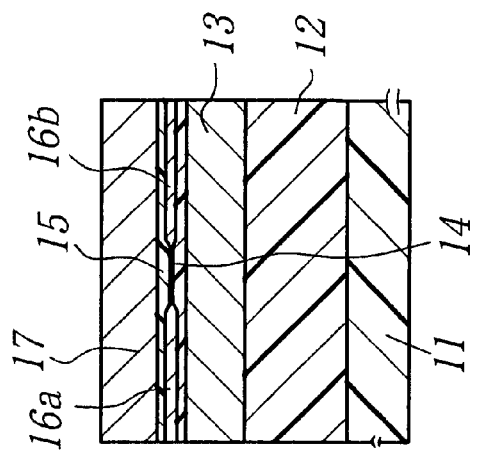
FIG. 42A
FIG. 42B

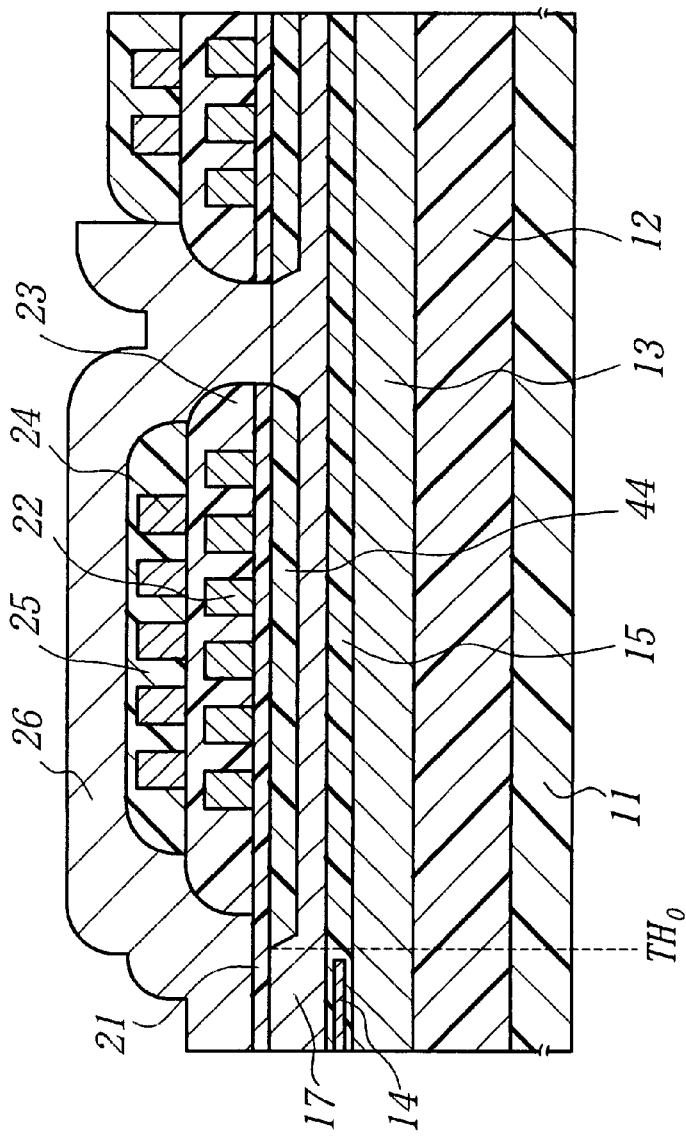
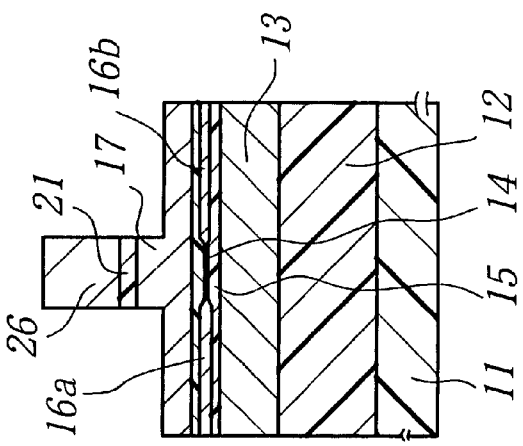

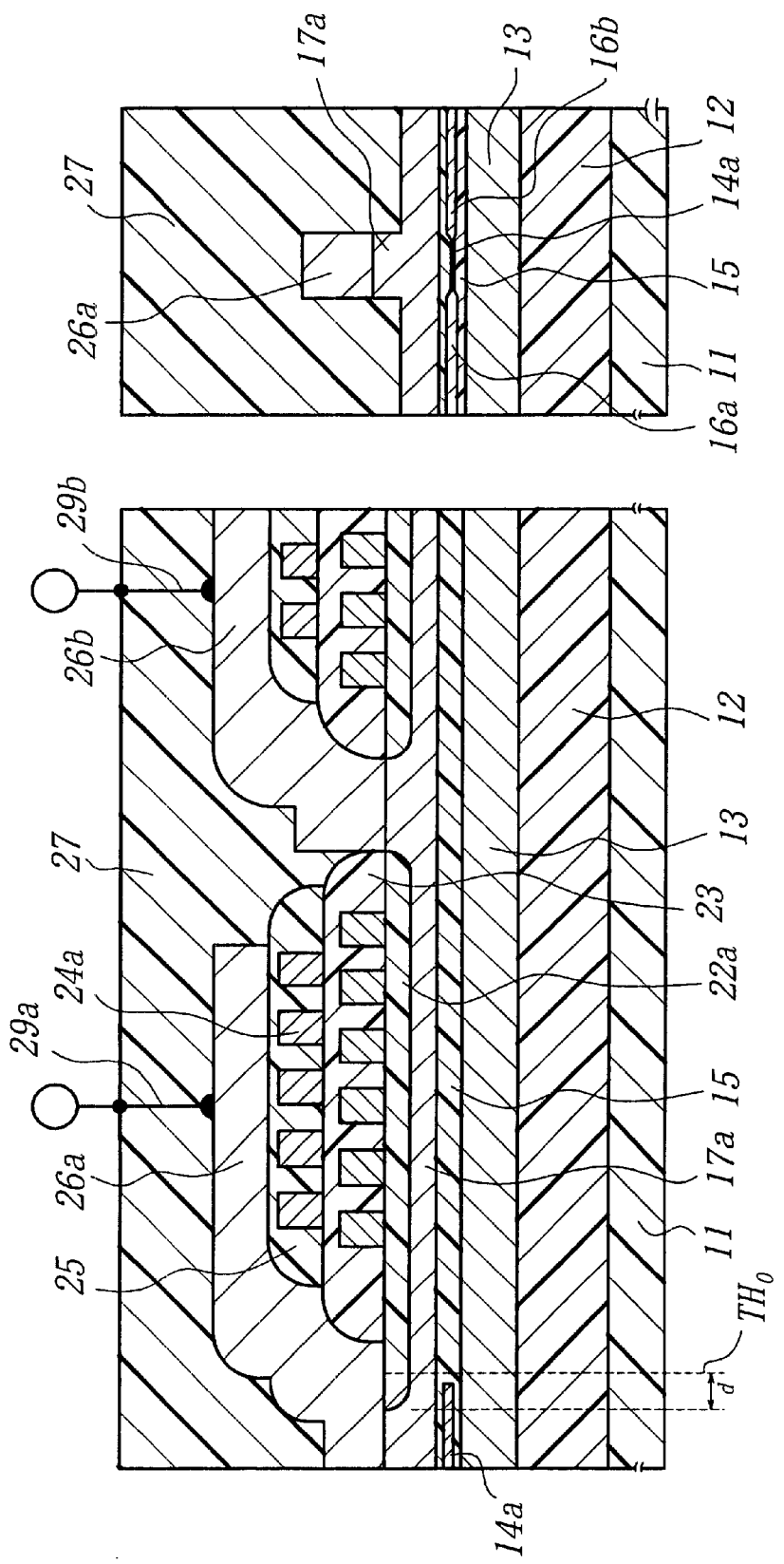

METHOD OF MANUFACTURING COMBINATION TYPE THIN FILM MAGNETIC HEAD AND WAFER FOR USE THEREFOR

BACKGROUND OF THE INVENTION

Field of Invention

This invention relates to a method for manufacturing a combination type thin film magnetic head having a writing inductive type thin film magnetic conversion element and a reading magnetoresistive effective type thin film magnetic conversion element which are, insulated magnetically and electrically, stacked on a substrate. Thin invention also relates to a wafer to be used in manufacturing the same thin film magnetic head.

RELATED ART STATEMENT

Recently, with the development of surface recording densities in hard disk devices, thin film magnetic heads are required to have excellent characteristics. For developing the performances of the reading thin film magnetic heads, magnetoresistive effective type thin film magnetic conversion elements are widely available. Although the magnetoresistive effective type thin film magnetic conversion elements using a normal anisotropic magnetoresistive (AMR) effect has been generally employed, the ones using a giant magnetoresistive (GMR), each element having a several times as large resistance variation as the AMR element, have been developed. In this specification, each of these AMR elements and GMR elements, etc., is generically called as a "magnetoresistive effective type thin film magnetic head" (often abbreviated to an "MR element" hereinafter) in brief.

The use of the AMR element enables a surface recording density of several giga bits/inch$^2$ to be realized, and the use of the GMR element enables the surface recording density to be more enhanced. Such a high surface recording density can realize a hard disk drive having a large capacity of more than 10 G bites. The height of the MR element (often called as an "MR Height" hereinafter) is a factor to determine the performance of the reading thin film magnetic head. The MR height is the distance of the MR element from an air bearing surface (often called as an "ABS" hereinafter) to its edge, and in a practical manufacturing process of the thin film magnetic head, the desired MR height can be obtained by controlling the polishing amount of the end of the head in forming the ABS.

In addition, the performances of the writing thin film magnetic heads are required to be developed. The development of the surface recording density requires an enhancement of a track density in a magnetic recording medium. Thus, the width of the write gap in the air bearing surface has to be narrowed to a submicron order from a several micron order, and for realizing it, a semiconductor processing technique is employed. A throat height (often called as a "TH" hereinafter) is a factor to determine the performance of the writing thin film magnetic head. The throat height is the distance of the magnetic pole portion to the ABS from the edge of the insulating film to electrically separate the thin film coil, and is desired to be as short as possible.

FIGS. 1–12 shows successive manufacturing steps of a conventionally normal thin film magnetic head and the same magnetic head. The thin film magnetic head is a combination type thin film magnetic head which has a writing inductive type thin film magnetic head and a reading thin film magnetic head with the MR element.

First of all, as shown in FIG. 1, an insulating layer 112 made of alumina ($Al_2O_3$) is formed in a thickness of about 5–10 μm on a substrate 111 made of alumina-titanium-carbon (AlTiC), for example. Then, as shown in FIG. 2, a bottom shield gap layer 113 is formed for protecting the reading MR reproducing element against an external magnetic field, and thereafter, as shown in FIG. 3, an insulating layer 114 is formed, of alumina, in a thickness of 100–150 nm by sputtering.

Subsequently, as shown in FIG. 3, a magnetoresistive layer 115 to constitute the MR reproducing element is formed, of a material having a magnetoresistive effect, in a thickness of several ten nm on the insulating layer 114, and thereafter, is processed in a desired formation through mask-alignment. Next, as shown in FIG. 4, an insulating layer 116 similar to the insulating film 114 is formed, and as shown in FIG. 5, a magnetic layer 117 is formed, of permalloy, in a thickness of 3–4 μm on the insulating layer 116. The magnetic layer 117 serves as a top shield magnetic layer to magnetically shield the MR reproducing element with the bottom shield magnetic layer 113, and also as a bottom magnetic layer for the writing thin film magnetic head. Herein, for convenience, the magnetic layer 117 is called as a "first magnetic layer" because it serves as one magnetic layer in the writing magnetic head.

Subsequently, a gap layer 118 is formed, of a nonmagnetic material, e.g., alumina, in a thickness of 150–300 nm, on the first magnetic layer 117. Then, on the gap layer is formed, in a desired pattern through precise mask-alignment, an insulative photoresist 119, on which a first layer-thin film coil 120 is formed, of Cu, for example, on the photoresist.

Next, as shown in FIG. 7, an insulative photoresist layer 121 is formed on the first layer-thin film coil 120 through precise mask-alignment, and thereafter, is baked at a temperature of 250° C., for example to flatten its top surface. Moreover, as shown in FIG. 8, a second layer-thin film coil 122 is formed on the flattened top surface of the photoresist layer 121, and a photoresist layer 123 is formed on the second layer-thin film coil 122 through precise mask-alignment. Thereafter, the photoresist 123 is baked at a temperature of 250° C., for example, to flatten its top surface. As mentioned above, the photoresist layers 119, 121, 123 are formed through the precise mask-alignment because the edges of the photoresist are the standard positions to define the Throat Height (TH) and the MR Height.

Subsequently, a second magnetic layer 124 is selectively formed, of permalloy, for example, on the gap layer 118 and the photoresist layers 119, 121, 123 alongside a given pattern. The second magnetic layer 124 is contacted with the first magnetic layer 117 in the remote side from the magnetoresistive layer 115, and the thin film coils 120 and 122 pass through the close magnetic circuit composed of the first and the second magnetic layers 117 and 124. The second magnetic layer 124 has the magnetic pole portion having a given shape and a given size to define a track width. Moreover, an overcoat layer 125 is formed, of alumina, on the exposed surfaces of the second magnetic layer 124 and the gap layer 118. Practically, a conductive pattern including the leads and pods to electrically connect the thin film coils 120, 122 and the MR reproducing element is formed, but not shown in the figures.

In the practical manufacture of the combination type thin film magnetic head, the above substrate 111 is composed of a wafer. Then, many thin film magnetic head units are formed on the wafer, arranged in matrix thereon, and the wafer is cut out in plural bars, each bar having the thin film magnetic head units in a row. The ends of the bar are polished to form the air bearing surfaces of the plural thin film magnetic heads at the same time, and then, the bar is cut out to obtain the combination type thin film magnetic head, respectively. That is, by polishing the side surface 126 in the side of the magnetoresistive layer 115 of the assembly shown in FIG. 10, an air bearing surface 127 is formed, opposing to a magnetic recording medium. During the formation of the air bearing surface, the magnetoresistive layer 115 is polished to obtain the MR reproducing element 128, and at the same time, the Throat Height TH and the MR Height are defined.

Because in the polish of the air bearing surface, the polish of the Throat Height and the MR Height can not monitored, the change of the resistance of the magnetoresistive layer 115 with the decrease of its height is monitored as the change of the current, for example by a resistance-measuring circuit connected to a conductive pattern (not shown in the figures) connected to the magnetoresistive layer 115 and the polished amount of magnetoresistive layer 115 is calculated from the current change. That is, by polishing the side surface 126 so that the MR reproducing element 128 can have a given resistance, the desired MR Height and the Throat Height can be obtained.

FIGS. 10, 11 and 12 are cross sectional view, an front view and a plan view of the conventional combination type thin film magnetic head manufactured by the above process, respectively. In FIG. 10, the alumina insulating layers 114 and 116 surrounding the MR reproducing element are depicted as a single insulating layer, respectively, and for simplifying the figures, the thin film coils 120 and 122 are depicted in concentric circle. As is shown in FIG. 10 clearly, the Apex Angle, which is defined as an angle θ between the line segment S linking the corners of the side surfaces of the photoresist layers 119, 121 and 123 to separate the thin film coils 120 and 122 in insulation and the top surface of the second magnetic layer 124, is an important factor to determine the performances of the thin film magnetic head, in addition to the above Throat Height and the MR height. Moreover, as is shown in the plan view of FIG. 12, the magnetic pole portion 124a of the second magnetic layer 124 has a narrowed width W, which defines the track width in the recording magnetic medium, so for realizing the high surface recording density, it is desired to narrow the width W as short as possible.

Since the development of the surface recording density of the magnetic recording density requires the enhancement of a recording head and a reproducing head, the above combination type thin film magnetic head requires a submicron-order control using a semiconductor-processing technique in its manufacturing process. It is the Throat Height of the writing inductive type thin film magnetic head and the MR Height of the reading thin film magnetic head composed of the MR reproducing element that largely influence the process yield of the combination type thin film magnetic head.

As is explained with reference to FIGS. 1–12, in the conventional manufacturing method of a thin film magnetic head, the resistance of the magnetoresistive layer 115 in the MR reproducing element is measured and then, the desired MR Height and Throat Height can be obtained through controlling the polished amount corresponding to the resistance. However, the relation between the resistance of the magnetoresistive layer 115 and the MR Height is not constant, so that the conventional method almost never give the desired MR Height. That is, since the magnetoresistive layer 115 has the fluctuation of its resistance due to its composition and its manufacturing conditions, the desired resistance does not always give the desired MR Height. The deviation of the MR Height from its desired value results in the deviation of the Throat Height. In this way, even if the resistance of the MR reproducing element has its desired value, the MR Height and the Throat Height often deviates from their desired values, resulting in the deterioration of the combination type thin film magnetic head.

To iron out the problem, for example, the specification of U.S. Pat. No. 4,689,877 (Kokai publication Kokai Sho 63-29315:JP A 63-29315) discloses that plural switching contacts, which are successively opened with the procedure of the polishing of the bar, are formed in series on the sides of the bar on which plural thin film magnetic heads are formed and guiding resistances, in which the resistance values varies continuously with the procedure of the polishing, are formed in parallel to each of the switching contacts, and the open of the switching contacts is detected through measuring the change of all the guiding resistances connected in series one another to give a desired Throat Height.

However, the conventional manufacturing method requires the additional manufacturing steps of forming the plural switching contacts on the both sides of the bar and forming the plural guiding resistances, resulting in the large degradation of the throughput. That is, the method requires the additional steps of forming the switching contacts of a conductive pattern and forming the guiding resistances of a resistive material. Moreover, the plural switching contacts are formed so that the distance between the neighboring switching contacts can be much larger than the size of the element constituting each switching contact in the polishing direction. Thus, the detection of the step-by-step change of the Throat Height from the measurement of the cut-off of the switching contacts and the detection of the continuous change of the Throat Height between the successive step-by-step change control the Throat Height, but the change of the guiding resistances fluctuates, so that they have difficulty in the precise minute control of the Throat Height, for example, 0.1–0.3 μm order-control of the Throat Height.

Moreover, the specification of U.S. Pat. No. 5,065,483 (Kokai publication Kokai Hei 4-360008: JP A 4-360008) discloses that as mentioned above, a polished amount of an air bearing surface is detected by using a resistive lapping element to detect the polished amount from its resistance change and a perfect lapping element to be polished perfectly, which are made of the same material as that of a magnetoresistive element. In this case, the step of forming the elements to detect the polished amount is simplified, but the resistance of the magnetoresistive material fluctuates relatively large, so that it is difficult to detect the polished amount from the change of the resistance precisely.

2. Description of Related Art

SUMMARY OF THE INVENTION

It is an object of the present invention to provide a method for manufacturing a combination type thin film magnetic head able to control the Throat Height and the MR Height of the same magnetic head precisely under their desired values without the decrease of their throughput.

It is another object of the present invention to provide a wafer suitable for the manufacturing method of a combination type thin film magnetic head.

A method for manufacturing a combination type thin film magnetic head comprises the steps of:

forming a first electrode member for a polished amount-monitoring element of the same magnetic material as that of a first magnetic pole portion constituting an inductive type thin film magnetic head so that the first electrode member can have the almost same construction as that of the first magnetic pole portion at the same time of the formation of a first magnetic member having the first magnetic pole portion before or after forming the reading magnetoresistive effective type thin film magnetic conversion element on the wafer constituting the substrate, forming a write gap layer so as to cover the first magnetic pole portion of the first magnetic member constituting an inductive type thin film magnetic head, forming a thin film coil supported by an insulating layer on the first magnetic member and the first electrode member, forming a second electrode member for the polished amount-monitoring element of the same magnetic material as that of a second magnetic pole portion opposing to the first magnetic pole portion via the write gap layer and constituting a second magnetic member of the inductive type thin film magnetic head which has the second magnetic pole portion and is magnetically connected to the first magnetic member so that the second electrode member can have the almost same construction as that of the second magnetic pole portion, directly contacted with the first electrode member without the write gap layer and the inside edge opposite to an air bearing surface of the joined surface between the first and second electrode members can have a given position to the standard position of the Throat Height zero, at the same time of the formation of the second magnetic member, forming a first and a second lead members connected to the first and the second electrode member for the polished amount-monitoring element respectively, cutting the wafer in plural bars so that each bar can have plural combination type thin film magnetic head units and at least one polished amount-monitoring element after forming the writing thin film magnetic conversion element and the reading thin film magnetic conversion element on the wafer, polishing the ends of the bars with monitoring the polished amount of the air bearing surface of the thin film magnetic head by electrically detecting the continuation and discontinuation between the first and second electrode member of the polished amount-monitoring element with a measuring circuit connected to the first and second lead members, and cutting the bar in plural combination type thin film magnetic head, each head having the air bearing surface polished so as to obtain a desired Throat Height.

According to the method for manufacturing a combination type thin film magnetic head of the present invention, since the first and second electrode member of the polished amount-monitoring element are made of the same material as the material constituting the inductive type thin film magnetic head, the polished amount-monitoring element does not need a peculiar material or process in its manufacture, so that the manufacturing method can be carried out easily and not expensively with its large throughput. Moreover, since the polished amount is measured by detecting the continuation or the discontinuation between the first and the second electrode members, the polished amount can be detected precisely without the influence of the resistance change in the magnetic resistive material as mentioned above.

In the manufacturing method of a combination type thin film magnetic head of the present invention, it is desired that each bar has plural polished amount-monitoring element, each having the same distance or the different distance to the standard position of the Throat Height zero from the inside edge opposite to the air bearing surface of the joined surface between the first and second electrode member. In the case that each polished amount-monitoring element has different distance to the standard position of the Throat Height zero from the inside edge opposite to the air bearing surface of the joined surface between the first and second electrode members, it has preferably the different distance by the 0.1–0.5 $\mu$m. Thereby, while the Throat Height of the thin film magnetic head, which is several micron to several submicron order, extremely short, is controlled precisely, the air bearing surface can be polished in submicron order.

Moreover, in the manufacturing method according to the present invention, it is desired that the plural polished amount-monitoring elements are dispersedly formed in the plural combination type thin film magnetic head units formed on the bar. In this case, the error of the Throat Height due to the inclination of the side of the air bearing surface can be reduced during the polish of the air bearing surface, so that the Throat Height can be controlled more precisely.

This invention also relates to a wafer to be used in the above manufacturing method. Concretely, this invention also relates to a wafer to be used in manufacturing a combination type thin film magnetic head in which a writing inductive type thin film magnetic conversion element and a reading magnetoresistive effective type thin film magnetic conversion element are stacked on a surface of a substrate with magnetically and electrically insulated, wherein in each area which is cut out later to constitute a bar, plural inductive type thin film magnetic heads, each having a first magnetic member with a first magnetic pole portion, a write gap layer formed so as to cover the first magnetic pole portion, a thin film coil formed on the first magnetic member so as to be supported by an insulating layer and a second magnetic member with a second magnetic pole portion opposing to the first magnetic pole portion via the write gap layer, magnetically connected to the first magnetic member in the opposite position to the first and second magnetic pole portions, and at least one polished amount-monitoring element having a first electrode member made of the same magnetic material as the first magnetic pole portion and having the almost same construction as that of first magnetic pole portion at the same time of the formation thereof, a thin film coil formed on the first electrode member so as to be supported by an insulating layer, a second electrode member having the same construction as that of the second magnetic pole portion, made of the same magnetic material as that of the second magnetic pole portion and formed so that it can directly contact with the first electrode member via the write gap layer and the inside edge of the opposite to an air bearing surface of its joined surface for the first electrode member can have a given position for the standard position of the Throat Height zero, and a first and a second lead members connected to the first and the second electrode members respectively, are formed with plural combination type thin film magnetic head units.

In a preferred embodiment of the wafer of the present invention, plural polished amount-monitoring elements, each having the same distance or the different distance to the standard position of the Throat Height zero from the inside edge opposite to the air bearing surface of the joined surface between the first and second electrode members, are formed in the area for the bar to be formed. In the case that each polished amount-monitoring element has the same distance to the standard position of the Throat Height zero from the inside edge opposite to the air bearing surface of the joined surface between the first and second electrode members, it is desired to form the plural polished amount-monitoring elements in the both ends of the bar or dispersedly. Moreover, in the case that each polished amount-monitoring elements has the different distance to the standard position of the Throat Height zero from the inside edge opposite to the air bearing surface of the joined surface between the first and second electrode members, it is desired to form the plural polished amount-monitoring elements so that the distance may be different by the 0.1–0.5 $\mu$m. Since in the above conventional method of detecting the polished amount by measuring the resistance change with the procedure of the polish, the resistance fluctuates largely, so that it is very difficult to detect the polished amount precisely.

Moreover, in the case that the plural polished amount-monitoring elements are formed in each area to be bar, as mentioned above, it is desired to form the monitoring elements dispersedly in the plural combination type thin film magnetic head units. Thereby, the influence of the inclination of the bar during the polish of the air bearing surface can be reduced.

BRIEF DESCRIPTION OF THE DRAWINGS

For a better understanding of this invention, reference is made to the attached drawings, wherein:

FIGS. 13A–20B are cross sectional views showing the successive steps in a first embodiment of the manufacturing method of a combination type thin film magnetic head according to the present invention, FIGS. 21A and 21B are a cross sectional views showing the controlling of the polish for the air bearing surface of the combination type thin film magnetic head using the polished amount-monitoring element, FIGS. 22A and 22B are cross sectional views showing the construction of a second embodiment in the polished amount-monitoring element, FIGS. 23A–29B are cross sectional views showing successive steps in a second embodiment of the manufacturing method of a combination type thin film magnetic head according to the present invention, FIGS. 30A and 30B are cross sectional views showing the construction of a fourth embodiment in the polished amount-monitoring element of the present invention, FIGS. 31A and 31B are cross sectional views showing a polished amount-monitoring element which is formed at the same time when the monitoring element of FIG. 30A is formed, FIGS. 32A and 32B are cross sectional views showing a polished amount-monitoring element which is formed at the same time when the monitoring elements of FIGS. 30A and 31A are formed, FIGS. 34A–34B are cross sectional views showing the construction of a fifth embodiment in the polished amount-monitoring element of the present invention, FIGS. 35A and 35B are cross sectional views showing a polished amount-monitoring element which is formed at the same time when the monitoring element of FIG. 34A is formed, FIGS. 36A and 36B are cross sectional views showing a polished amount-monitoring element which is formed at the same time when the monitoring elements of FIGS. 34A and 35A are formed, FIGS. 37A and 37B are cross sectional views showing the construction of a sixth embodiment in the polished amount-monitoring element of the present invention, FIGS. 38A and 38B are cross sectional views showing a polished amount-monitoring element which is formed at the same time when the monitoring element of FIG. 37A is formed, FIGS. 39A and 39B are cross sectional views showing a polished amount-monitoring element which is formed at the same time when the monitoring elements of FIGS. 37A and 38A are formed, FIGS. 40A–44B are cross sectional views showing the successive steps in a third embodiment of the manufacturing method of a combination type thin film magnetic head of the present invention.

DETAILED DESCRIPTION OF PREFERRED EMBODIMENTS

This invention will be described hereinafter, with reference to preferred embodiments.

First Embodiment of the Manufacturing Method

FIGS. 13A–21B show the successive steps of an embodiment of the manufacturing method of a combination type thin film magnetic head according to the present invention. In each figure, for clarifying the features of this invention, the size of each constituting part is exaggerated. Moreover, the same part in each figure is designated by the same reference number.

Figure 1:
FIGS. 1–10 are cross sectional views showing the successive steps of the conventional manufacturing method of a combination type thin film magnetic head.
Figure 2:
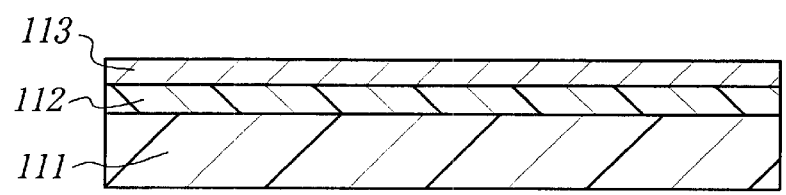
Figure 3:
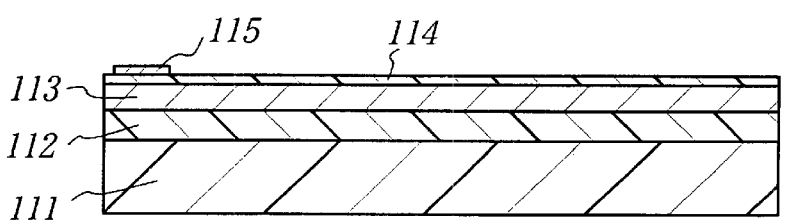
Figure 4:
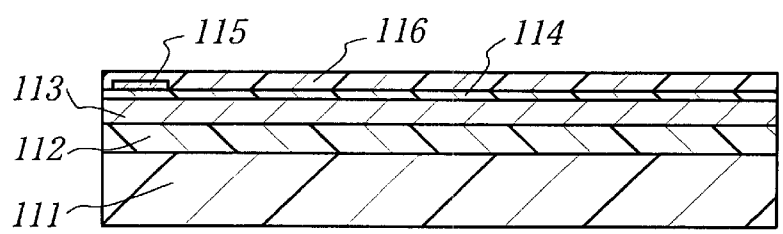
Figure 5:
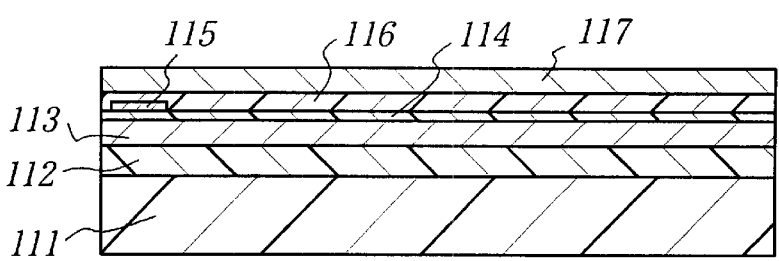
Figure 6:
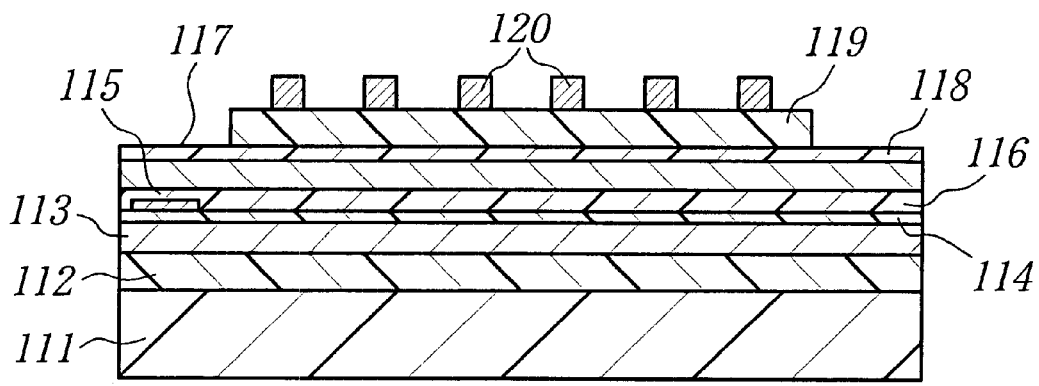
Figure 7:
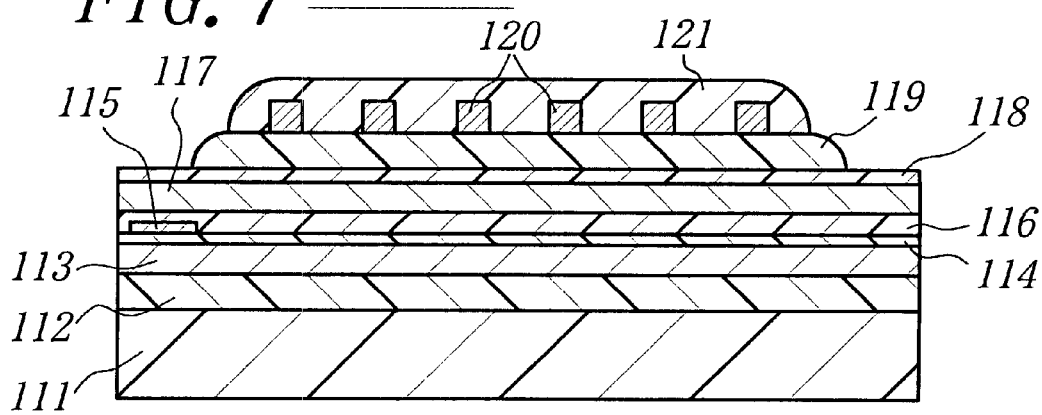
Figure 8:
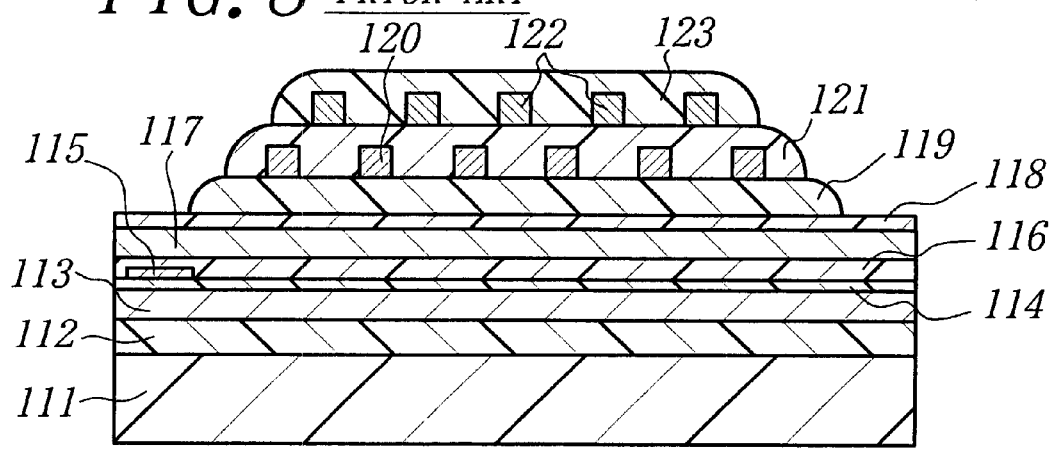
Figure 9:
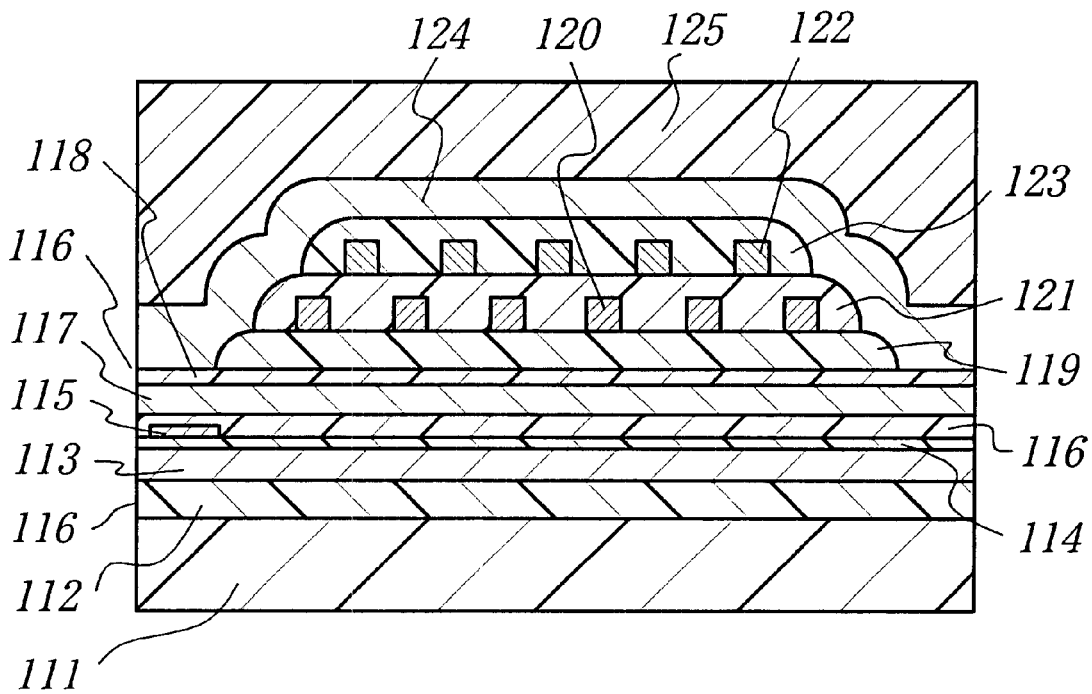
Figure 10:
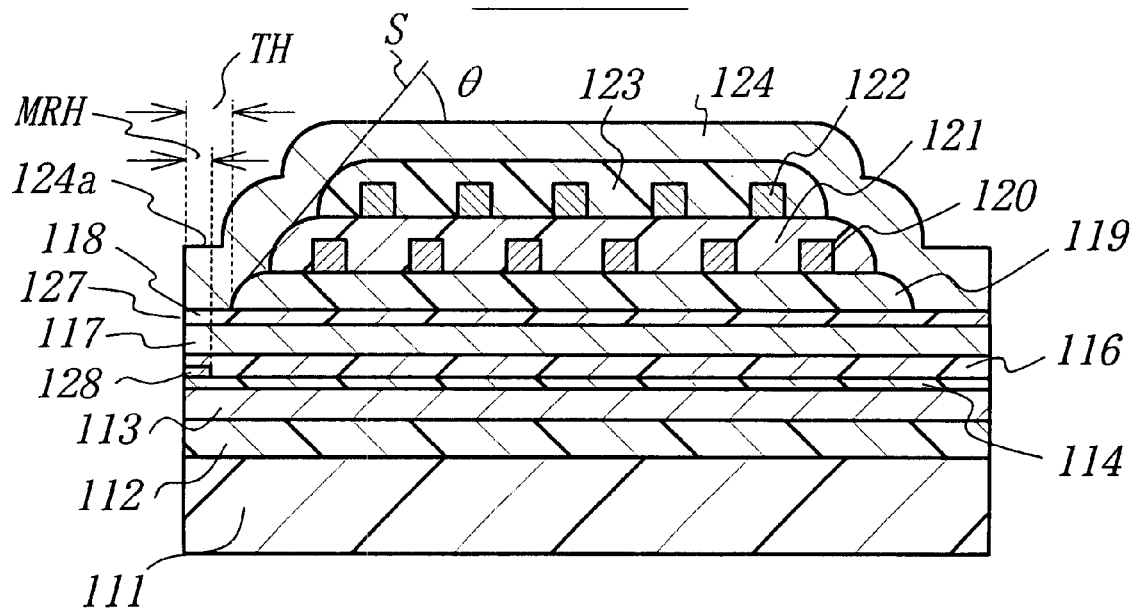
Figure 11:
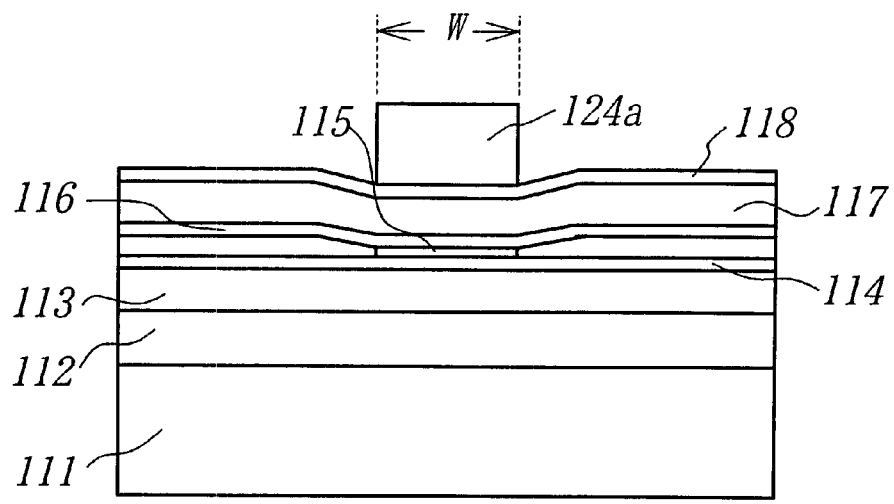
FIGS. 11 and 12 are an elevational view and a plan view of the combination type thin film magnetic head, respectively.
Figure 12:
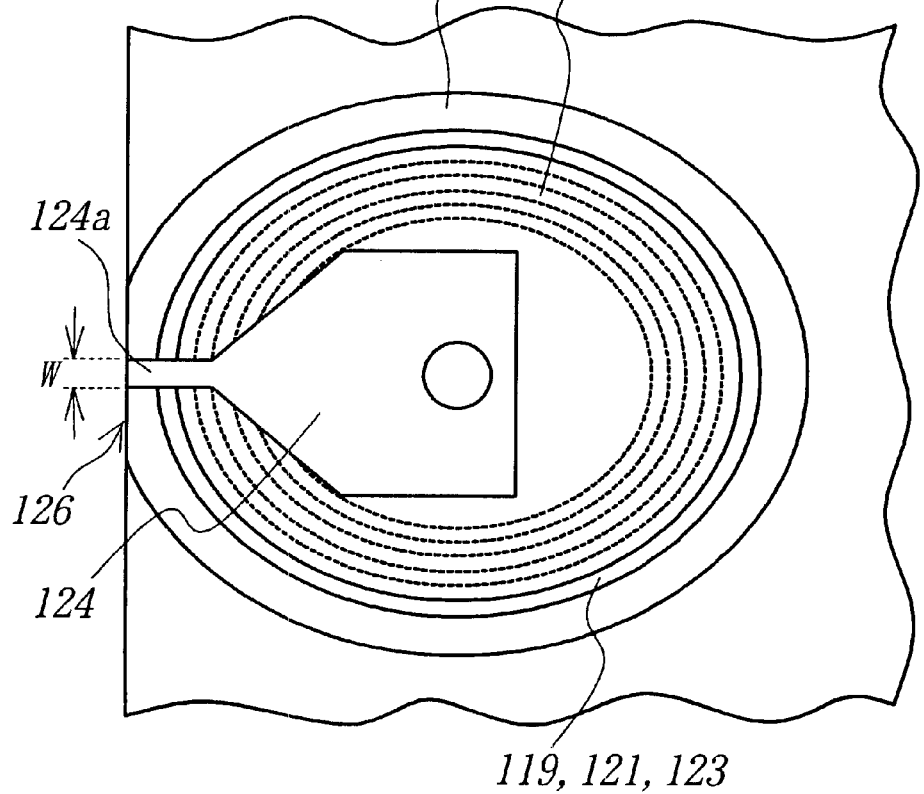
Figure 13A:
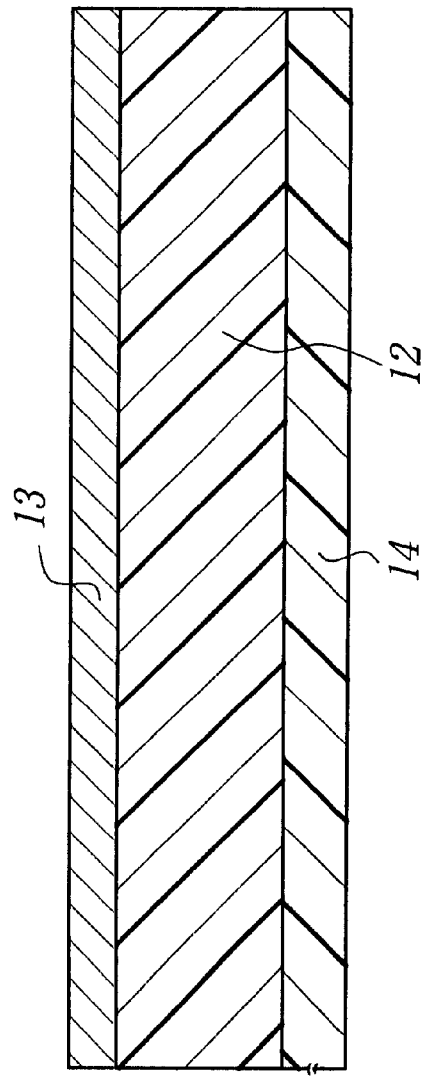
Figure 13B:
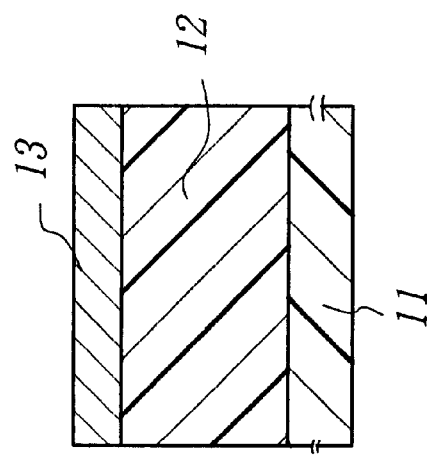

First of all, as shown in FIGS. 13A and 13B, an insulating layer 12 is formed, of alumina, in a thickness of 5–12 nm entirely over the surface of a substrate 11 made of AlTiC, and thereafter, a bottom shield layer 13 to shield an MR reproducing element from an external magnetic field is formed, of permalloy, in a thickness of 2–3, $\mu$m on the insulating film 12.

Next, as shown in FIGS. 14A and 14B, after a bottom shield gap layer is formed, of alumina, in a thickness of 70–400 nm on the bottom shield layer 13 by sputtering, a GMR layer 14 to constitute a GMR reproducing element is formed in a thickness of several nm near the side surface in which an air bearing surface is to be formed. In this case, although a resistive pattern to monitor the polished amount may be formed at the same time as in the conventional manufacturing method, it does not suit the purpose of the present invention. Moreover, the GMR layer is patterned in a given shape and thereafter, a top shield gap layer is formed, of alumina, in a thickness of 70–400 nm so as to cover the patterned GMR layer 14 by sputtering. As a result, the GMR layer 14 embedded in the bottom and top shield gap layers can be obtained. For clarification, the top and the bottom shield gap layers are depicted by a single shield gap layer 15. Leads to connect the GMR layer 14 to an external circuit are designated by numerals "16a" and "16b", respectively.

Furthermore, as shown in FIGS. 14A and 14B, a bottom pole 17 constituting an inductive type thin film magnetic head doubling as a top seed layer for the GMR reproducing element is formed, of permalloy, in a thickness of 1.5–2.5 $\mu$m on the shield gap layer 15, and a bottom pole chip 18 is formed, of a magnetic material having large saturated magnetic flux density, in a thickness of 1–2 $\mu$m on the bottom pole 17. At the same time when the bottom pole chip 18 is formed, a connecting member to magnetically connect the bottom pole and a top pole is formed.

Next, as shown in FIGS. 15A and 15B, an insulating layer 20 is formed, of alumina, in a thickness of 3–4 $\mu$m and thereafter, is polished flat by chemical-mechanical polishing (CMP) until the surfaces of the bottom pole chip 18 and the connecting member 19 are exposed. Instead of the CMP, a mechanical polishing may be used to flatten the surfaces.

Subsequently, as shown in FIGS. 16A and 16B, a write gap layer 21 is formed, of alumina, in a thickness of 0.2–0.3 $\mu$m on the flattened surfaces and a first layer-thin film coil 22 is formed on the write gap layer 21. Although the above steps are similar to the steps in the conventional manufacturing method, in this invention, as shown in FIGS. 17A and 17B, the write gap layer is selectively removed or not formed from the beginning in the area in which the polished amount-monitoring element is to be formed, and the first layer-thin film magnetic head is directly formed on the insulating layer 20. Since the thin film coil does not serve as a coil practically in the inductive type thin film magnetic head, it is called as a "dummy thin film coil 22a". Accordingly, the GMR layer, the bottom pole chip and the bottom pole chip are dummy in the area which the polished amount-monitoring element, they are designated by numerals "14a", "17a" and "18a". Moreover, the connecting member to connect the bottom pole and the top pole serves as an electrical connecting member, hereinafter, it is called as a "connecting member 19a".

Subsequently, as shown in FIGS. 18A–19B, a photoresist insulating layer 23 is formed so as to cover the first layer-thin film coil 22 and the dummy thin film coil 22a in both areas in which the inductive type thin film magnetic head and the polished amount-monitoring element are formed, and is flattened by thermal treatment. Thereafter, a second layer-thin film coil 24 and a dummy thin film coil 24a are formed, and a photoresist insulating layer 25 is formed to cover the second layer-thin film coil 24 and the dummy thin film coil 24a, flattened by another thermal treatment to obtain the flat surface of the thin film coil.

Moreover, as shown in FIGS. 18A and 18B, a top pole 26 is formed, of permalloy, in a thickness 2–3, $\mu$m so that its magnetic pole portion may oppose the bottom pole chip 18 in the area for the inductive type thin film magnetic head to be formed and so that it may be directly connected to the connecting member 19 in the area remote from the air beating surface. At the same time, in the area for the polished amount-monitoring element to be formed, as shown in FIG. 19, are formed a first dummy top pole (second electrode member) 26a so as to connect to the first dummy bottom pole chip (first electrode member) 18a and a second dummy top pole 26b (a part of a second lead member) so as to connect to the connecting member 19a. Accordingly, the first and the second dummy poles 26a and 26b are formed so as to be electrically connected each other through the dummy bottom pole chip 18a, the dummy bottom pole chip 17a and the connecting member 19a and not to be electrically connected each other above the dummy thin film coils. In this invention, the construction shown in FIGS. 19A and 19B is called as a "polished amount-monitoring element.

Figure 20B:
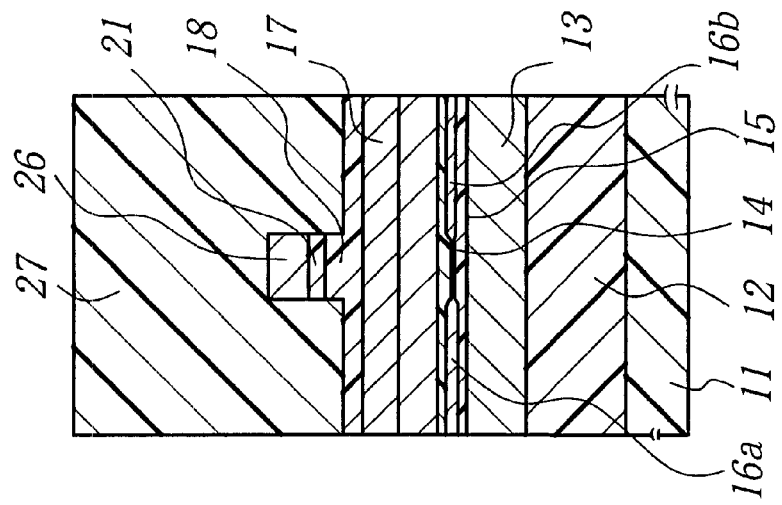
Figure 20A:
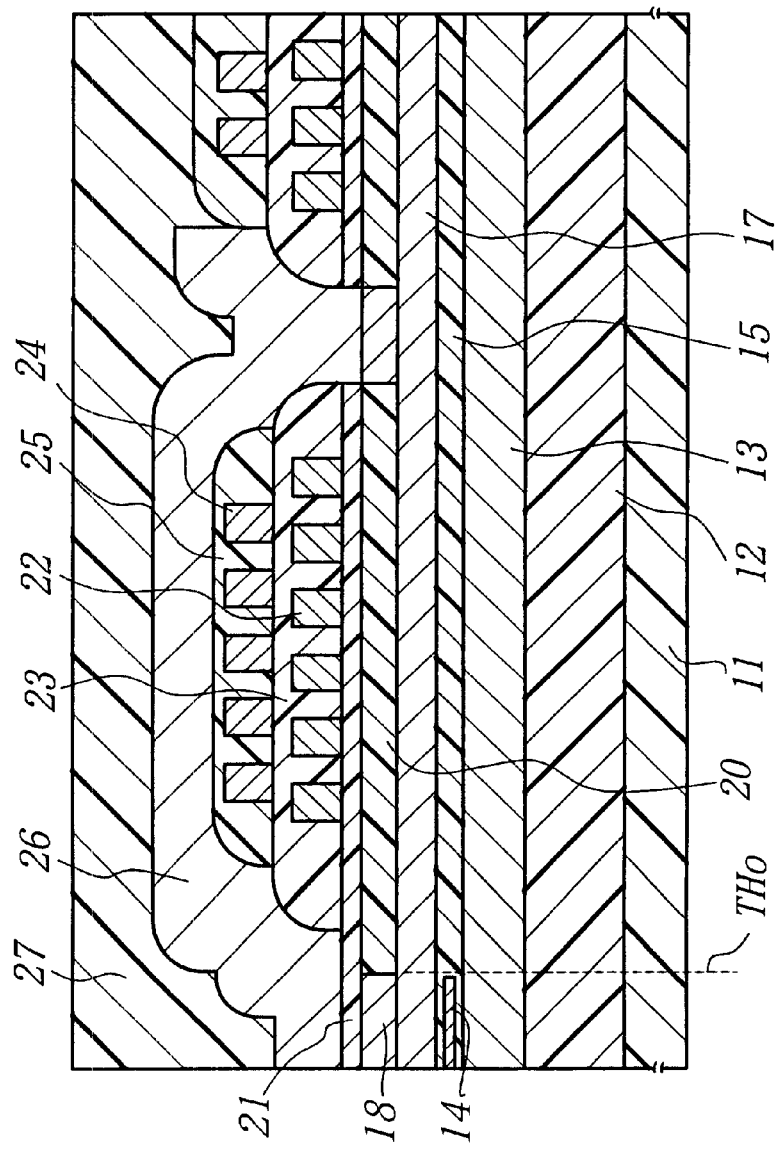
Figure 25B:
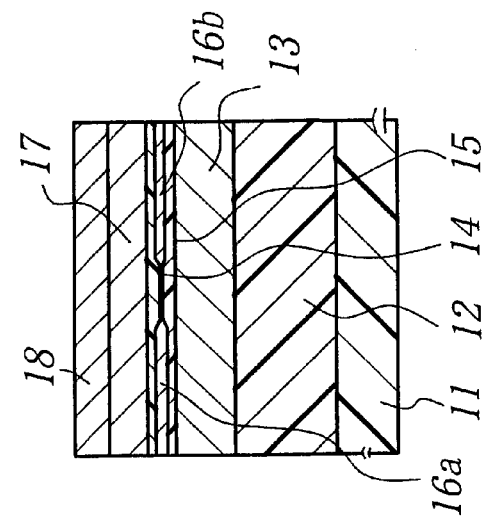
Figure 25A:
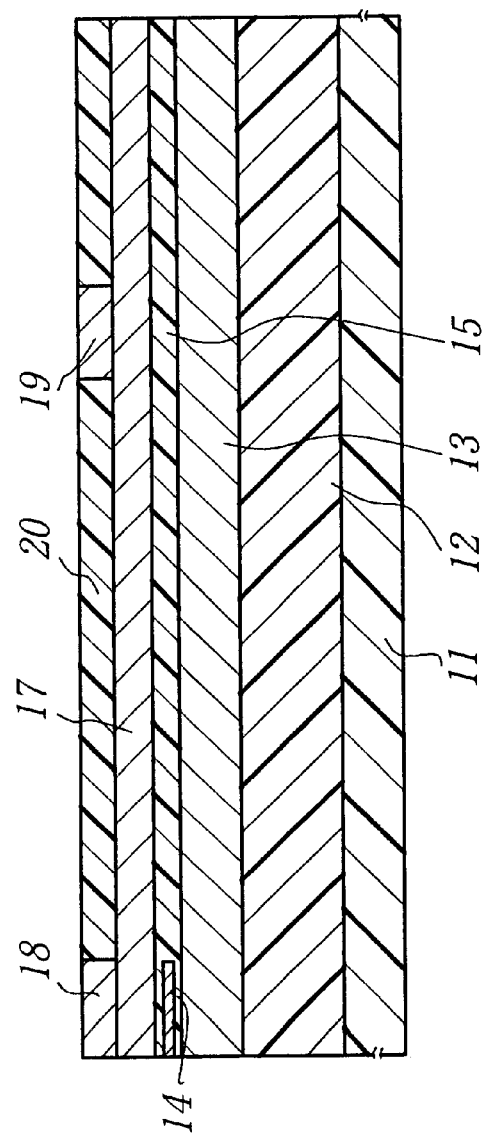

Next, as shown in FIGS. 20A and 20B, in the area for the inductive type thin film magnetic head to be formed, the part of the write gap layer 21 near the top pole portion 26 is removed by using the top pole portion as a mask, and thereafter, the bottom pole chip 18 is partially removed in its thickness direction to form a trim structure. In this case, it is effective for improving the process efficiency and enhancing the characteristics of the polished amount-monitoring element to remove the write gap film 21 and the bottom pole 17 by reactive ion etching and by ion beam etching, respectively, but this invention is not limited to the combination of the reactive ion etching and the ion beam etching. Moreover, as shown in FIGS. 21A and 21B, the etching treatment is carried out for the area for the polished amount-monitoring element to be formed. Since there is not the write gap layer in the area, the dummy bottom pole chip 18a tends to be somewhat over-etched, which does not influence the inductive type thin film magnetic head because the area is not used for the magnetic head.

First Embodiment of the Polished Amount-monitoring Element

Moreover, an overcoat layer 27 is formed, of alumina, in a thickness of 20–30 $\mu$m over the assembly. Before forming the overcoat layer 27, in the area for the polished amount-monitoring element to be formed are formed a first and a second leads 29a and 29b to connect the first and second dummy pole 26a and 26b to an external measuring circuit 28. Since these leads may be formed at the same time when the combination type thin film magnetic head unit is formed, the manufacturing method of the present invention does not require additional steps. Herein, in FIGS. 21A and 21B, the first and second leads 29a and 29b are simplified for convenience of explanation.

As mentioned above, after the combination type thin film magnetic head unit and the polished amount monitoring element are formed at the same time, the side surface of the assembly is polished to form the air bearing surface. In this invention, the shift of the discontinuation from the continuation of the polished amount-monitoring surface is detected by the measuring circuit 28 during the polishing process, and the detected output is supplied to a polish-controlling circuit 30 and controls the polishing machine 31 through the controlling circuit 30.

That is, first, the dummy bottom pole 17a and the first dummy pole 26a are electrically connected each other by the dummy bottom pole chip 18a. When the dummy bottom pole chip 18a is removed perfectly with the procedure of the polish, the dummy bottom pole 17a and the first dummy pole 26a are electrically shut down. In this way, by detecting the continuation or the discontinuation between the first and second dummy pole 26a and 26b with the measuring circuit 28, the polishing condition whether the polishing is proceeded to the inside edge of the dummy bottom pole chip 18a or not is monitored. When the discontinuation between the first and the second dummy poles 26a and 26b is detected, the polishing machine is stopped via the polish-controlling circuit 30. In this embodiment, by setting the inside edge of the dummy bottom pole chip 18a to the position TH, shifted to the air bearing surface by a distance d equal to a desired length of the Throat Height from the standard position $TH_0$ of the Throat Height zero to be determined by the position of the inside edge of the bottom pole chip 18, a desired Throat Height can be obtained constantly.

Second Embodiment of the Polished Amount-monitoring Element

FIGS. 22A and 22B are cross sectional views showing a second embodiment of the polished amount-monitoring element, and in the figure, the similar parts are designated by the salve reference numerals as in the above embodiment. Although except the write gap layer 21, the polished amount-monitoring element has the similar structure to that of the combination type thin film magnetic head unit in the above embodiment, the thin film coil is omitted from the structure of the polished amount-monitoring element-structure in this embodiment. That is, in this embodiment, the first and second dummy poles 26a and 26b are formed on the flat surfaces of the bottom pole chip 18a and the insulating layer 20. These dummy poles 26a and 26b are connected to the measuring circuit 30 via the leads 29a and 29b.

As is apparent from the above explanation, since in this invention, the polished amount-monitoring element does not require the functions of the combination type thin film magnetic head, the thin film coils may be omitted as in thin embodiment. However, it is often effective to form the thin film coils as in the above embodiment because the first and second dummy pole 26a and 26b can be formed at the same time when the top pole of the combination type thin film magnetic head is formed. On the other hand, since in this embodiment, the first and second dummy poles 26a and 26b can be formed on the flat surfaces of the bottom pole chip 18a and alumina insulating layer 20, a pattern edges can be advantageously formed more clearly.

Second Embodiment of the Manufacturing Method

FIGS. 23A–29B show the successive steps in a second embodiment of the manufacturing method of a combination type thin film magnetic head according to the present invention. In this embodiment, the similar parts are designated by the same references, too.

The steps shown in FIGS. 23A–25B are similar to the ones shown in FIGS. 13–15. As shown in FIGS. 26A and 26B, in this embodiment, a top pole chip 35 is formed in a thickness of 2–3 µm on the write gap layer 21 and a connecting member 36 is formed so as to connect the connecting member 19 formed at the same time as the formation of the bottom pole chip 18. Then, the first layer-thin film coil 22 is formed in a thickness of 2–3 µm. The top pole chip 35 is made of a material having a large saturated magnetic flux density.

Subsequently, as shown in FIGS. 27A and 27B, the thus obtained assembly is etched by using the top pole chip 35 as a mask to form a trim structure, and an insulating layer 37 is formed, of inorganic insulating material such as alumina, in a thickness of 3–4 µm so as to cover the first layer-thin film coil 22 and the top pole chip 35 and thereafter, is flattened by CMP to expose the surface of the top pole chip 35.

Figure 28B:
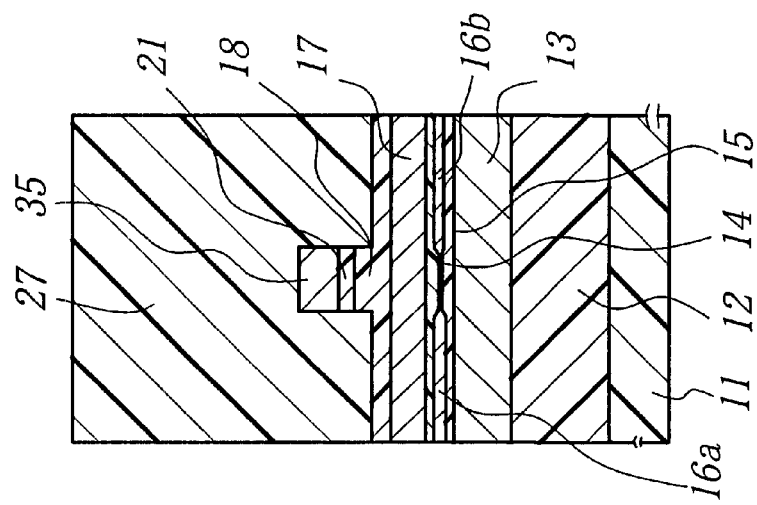
Figure 28A:
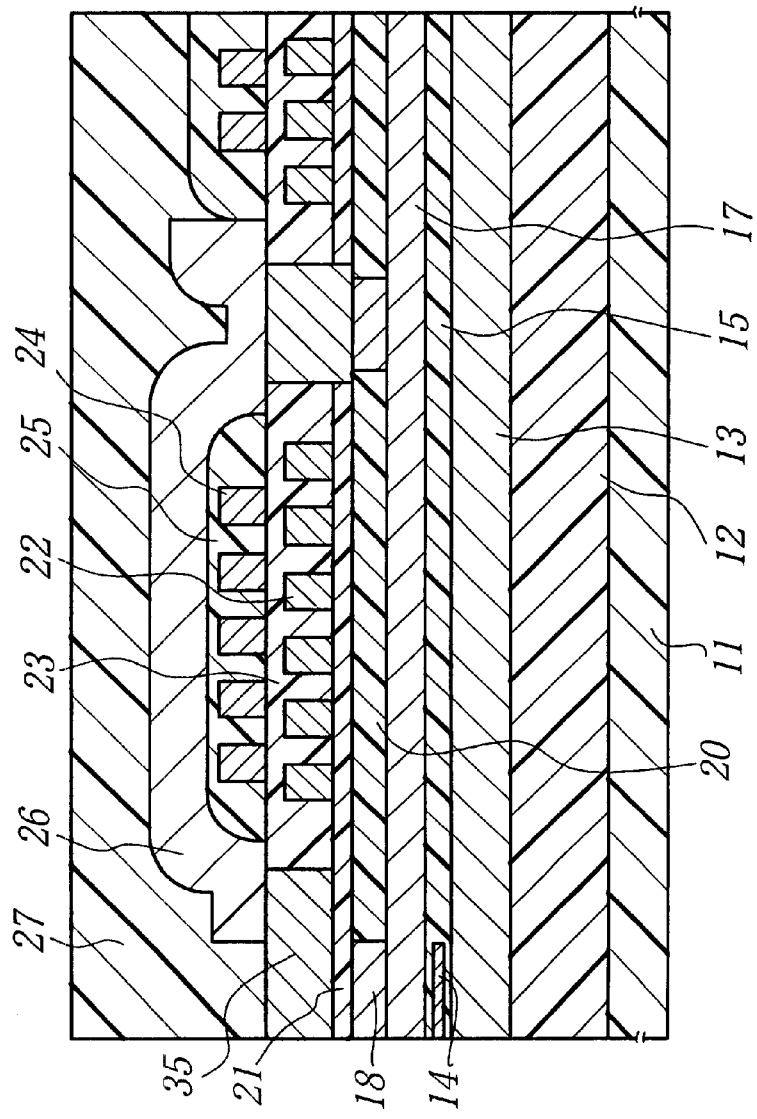

Furthermore, as shown in FIGS. 28A and 28B, after the second layer-thin film coil 24 is formed on the first layer-thin film coil 22 and is separated in insulation by the insulating layer 25 made of photoresist, the top pole 26 is formed so as to connect the top pole chip 35 in its magnetic pole portion and to connect the connecting member 36 in the area remote from its magnetic pole portion. In this embodiment, the top pole 26 is formed so that its forefront can be receded from the air bearing surface. Moreover, as in the first embodiment, the overcoat layer 27 made of alumina is formed over the whole assembly.

Third Embodiment of the Polished Amount-monitoring Element

In this embodiment, at least one polished amount-monitoring element are formed in plural combination type thin film magnetic head units on one wafer. FIGS. 29A and 29B show the construction of the polished amount-monitoring element in this embodiment. Compared with the combination type thin film magnetic head unit shown in FIGS. 28A and 28B, the polished amount-monitoring element shown in FIGS. 29A and 29B has the similar construction except that it does not have the write gap film 21. As in the above embodiment, the inside edge of the dummy bottom pole chip 18a opposite to the air bearing surface corresponds to the position TH1 shifted by the distance d equal to the desired Throat Height from the standard position $TH_0$ of the Throat Height zero. In this embodiment, too, the first and second dummy poles 26a and 26b of the polished amount-monitoring element are connected to the measuring circuit 28 via the leads 29a and 29b.

In this embodiment, too, the shift of the discontinuation from the continuation in the polished amount-monitoring element is detected by the measuring circuit 28 during the polish of the air bearing surface, and the detected output is supplied to the polish-controlling circuit 30 and controls the polishing machine 31 through the controlling circuit 30. That is, first, the first and the second dummy poles 26a and 26b are electrically connected each other by the dummy bottom pole chip 18a and the dummy top pole chip 35. When the dummy bottom pole chip 18a is removed perfectly with the procedure of the polish, the first and the second dummy poles 26a and 26b are electrically shut down. In this way, by detecting the continuation or the discontinuation between the first and second dummy pole 26a and 26b with the measuring circuit 28, the polishing condition whether the polishing is proceeded to the inside edge of the dummy bottom pole chip 18a or not is monitored. When the discontinuation between the first and the second dummy poles 26a and 26b is detected, the polishing machine is stopped via the polish-controlling circuit 30. In this embodiment, by setting the inside edge of the dummy bottom pole chip 18a to the position TH, shifted to the air bearing surface by a distance d equal to a desired length of the Throat Height from the standard position $TH_0$ of the Throat Height zero, a desired Throat Height can be obtained constantly, as mentioned above.

Although in the above embodiment, the inside edge of the dummy bottom pole chip 18a is set to the position shifted to the air bearing surface by the distance d equal to the desired Throat Height from the standard position of the Throat Height zero and the polishing is stopped when the discontinuation of the polished amount-monitoring element is detected, for controlling the Throat Height precisely in submicron-order, plural polished amount-monitoring elements are formed so as to have the different distance d, respectively and the polish of the air bearing surface may be controlled with monitoring the continuation or the discontinuation of the monitoring elements.

Fourth Embodiment of the Polished Amount-monitoring Element

FIGS. 30A–32B show three polished amount-monitoring elements in which the inside edges of the dummy bottom pole chips 18a are separated from the standard position of the Throat Height zero to the air bearing surface by the different distances, respectively. Their fundamental constructions are the same as that of the polished amount-monitoring element shown in FIGS. 29A and 29B. In this embodiment, the distance $d_1$ between the inside edge of the dummy bottom pole chip 18a and the standard position $TH_0$ of the Throat Height zero in the polishes amount-monitoring element shown in FIG. 30A is set to be 0.7 μm, the distance $d_2$ between the inside edge of the dummy bottom pole chip 18a and the standard position $TH_0$ of the Throat Height zero in the polishes amount-monitoring element shown in FIG. 31 being set to be 0.8 μm, and the distance $d_3$ between the inside edge of the dummy bottom pole chip 18a and the standard position $TH_0$ of the Throat Height zero in the polishes amount-monitoring element shown in FIG. 32A is set to be 1.0 μm.

As mentioned above, in this embodiment, the plural polished amount-monitoring elements having the different distances $d_1$, $d_2$, $d_3$ from the standard position $TH_0$ of the Throat Height zero are formed. Therefore, the discontinuation between the first dummy pole 26a and the second dummy pole 26b in the polished amount-monitoring element having the longest distance $d_3$ (shown in FIG. 32A) is detected, so that the polishing procedure of a 1.0 μm distance from the standard position of the Throat Height zero is detected. When the Throat Height of 0.7 μm is desired, the polishing procedure of a 0.8 μm distance from the standard position of the Throat Height zero is detected from the discontinuation in the polished amount-monitoring element shown in FIG. 31. In this time, the polishing velocity is slowed and the polishing is stopped as soon as the discontinuation in the polished amount-monitoring element is detected. In this way, the combination type thin film magnetic head having a desired 0.7 μm Throat Height can be obtained.

Figure 33:
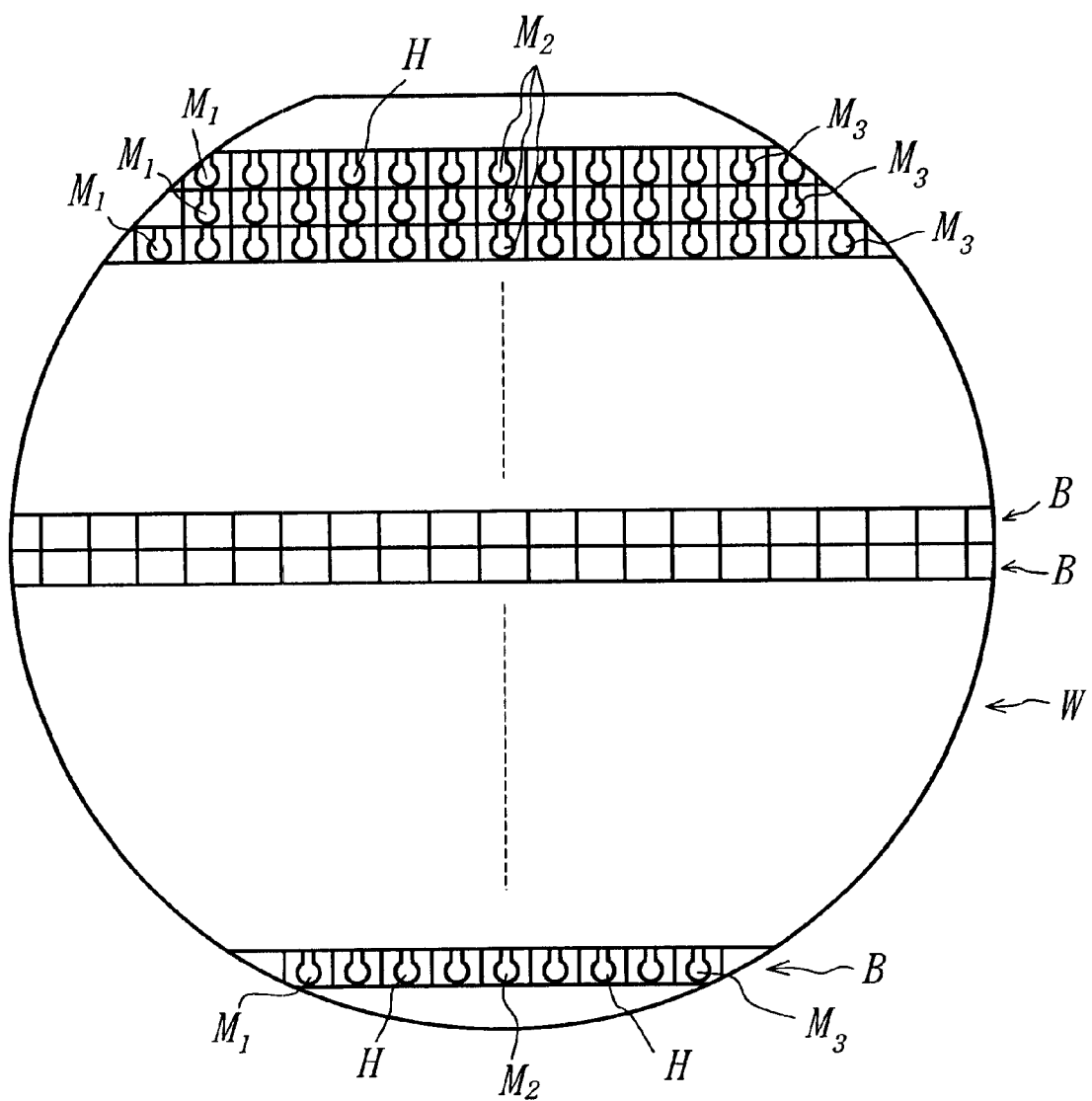
FIG. 33 is a plan view diagrammatically showing the wafer of the present invention on which plural polished amount-monitoring elements are formed.

FIG. 33 is a plan view diagrammatically showing the arrangement of the three kinds of polished amount-monitoring element, each having different distance from the standard position of the Throat Height zero, on the wafer. As mentioned above, in a real manufacture of the combination type thin film magnetic head, many combination type thin film magnetic head units H are formed in matrix on a wafer, which is cut out in plural bars B, each bar having many combination type thin film magnetic head units. Thereafter, the sides of each bar is polished to form many combination type thin film magnetic heads at the same time. In this embodiment, the above three kinds of polished amount-monitoring element $M_1$, $M_2$, $M_3$ are dispersedly placed in the both ends and the center of the each bar.

Fifth Embodiment of Polished Amount-monitoring Element

FIGS. 34A–36B show a fifth embodiment of the three kinds of polished amount-monitoring element in which the inside edges 18a of the dummy bottom pole chip 18a are separated by different distances from the standard position of the Throat Height zero, respectively. In the polished amount-monitoring element of this embodiment, the dummy second layer-thin film coil 24a and the insulating layer 25 to cover the thin film coil are omitted from the polished amount-monitoring element shown in FIG. 29A, and the first and second dummy poles 26a and 26b are formed flat. Herein, the overcoat layer is omitted in the figures.

Sixth Embodiment of Polished Amount-monitoring Element

FIGS. 37–39 show a sixth embodiment of the three kinds of polished amount-monitoring element in which the inside edges 18a of the dummy bottom pole chip 18a are separated by different distances from the standard position of the Throat Height zero, respectively. In this embodiment, the dummy first layer-thin film coil 22a is removed.

Third Embodiment of the Manufacturing Method

FIGS. 40A–44B are cross sectional views showing successive steps in a third embodiment of the manufacturing method of a combination type thin film magnetic head. As shown in FIG. 40A, the insulating layer 12 is formed in a thickness of 5–10 μm entirely over the substrate 11 made of AlTiC, and thereafter, the bottom shield layer 13 to shield the MR reproducing element from an external magnetic field is formed in a thickness of 2–3 μm.

Subsequently, as shown in FIG. 41A, the GMR layer 14 is formed so as to be embedded in the shield gap layer 15 and thereafter, the bottom pole 17 is formed in a thickness of 2.5–3.5 μm on the shield gap layer. Moreover, a photoresist layer 41 is formed alongside a given pattern, and etched by ion beam etching in this embodiment to form a depressed portion 42. In the center of the depressed portion is formed an island-shaped connecting member 43.

Next, as shown in FIGS. 42A and 42B, after the photoresist layer 41 is removed, an insulating layer 44 is formed, of alumina, in a thickness of 3–4 μm, and is polished flat by CMP to expose the surfaces of the magnetic pole portion of the bottom pole 17 and the connecting member 43.

Subsequently, as shown in FIGS. 43A and 43B, after the write gap layer 21 is formed, the first-layer thin film coil 22, the insulating layer 23 to cover the first layer-thin film coil, the second layer-thin film coil 24 and the insulating layer 25 to cover the second layer-thin film coil 25 are formed as in the first embodiment, and the top pole 26 is formed so as to contact with the magnetic pole portion of the bottom pole 17 and the connecting member 43. Thereafter, the overcoat layer, not shown in FIGS. 43A or 43B, is formed so as to cover the thus obtained assembly entirely. In the construction shown in FIGS. 43A and 43B, the standard position of the Throat Height zero is defined by the edge position of the depressed portion 42 in the side of the air bearing surface.

Seventh Embodiment of the Polished Amount-monitoring Element

FIGS. 44A and 44B show the construction of the polished amount-monitoring element in this embodiment. Except that the write gap layer 21 is not formed and the edge position of the depressed portion in the side of the air bearing surface is shifted toward the air bearing surface from the standard position $TH_0$ of the Throat Height zero by a given distance d, the polished amount-monitoring element has the same construction as that of a normal combination type thin film magnetic head. Furthermore, the dummy first and second poles 26a and 26b are connected to an external measuring circuit via the leads 29a and 29b.

In this embodiment, the dummy first and second poles 26a and 26b in FIGS. 44A and 44B are monitored about their electric continuation and discontinuation by the measuring circuit 28. When the discontinuation of the dummy poles is detected, the polishing machine 31 is stopped via the polish-controlling circuit 30, so that the desired Throat Height can be obtained.

Eighth Embodiment of the Polished Amount-monitoring Element

Figure 45:
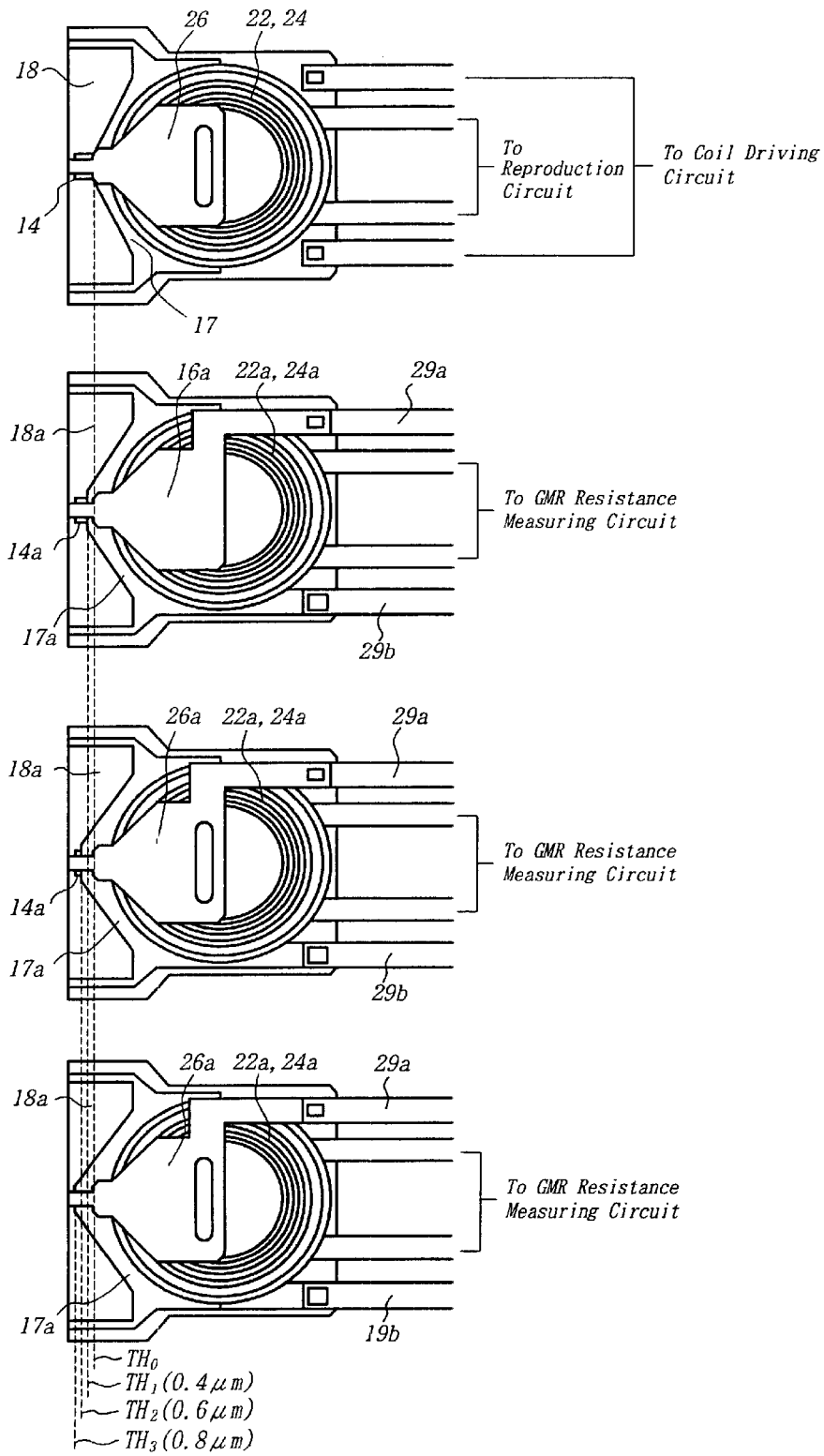
FIG. 45 is a diagrammatically plan view showing combination type thin film magnetic head units and polished amount monitoring elements which are to be formed on the wafer.

FIG. 45 is a plan view diagrammatically showing the combination type thin film magnetic head manufactured according to the present invention and an eighth embodiment of the polished amount-monitoring element. In this embodiment, three polished amount-monitoring elements, each having different distance d, of 0.4 μm, $d_2$ of 0.6 μm or $d_3$ of 0.8 μm to the standard position $TH_0$ of the throat Height zero from the edge portion opposite to the air bearing surface of the joined surface between the dummy bottom pole chip 18a and the dummy top pole 26a, are formed.

Although in the above embodiment, the polished amount is monitored by detecting the continuation or discontinuation between the dummy first and second dummy poles 26a and 26b, in this embodiment, the part of the dummy bottom pole 17a is elongated toward the opposite side to the air bearing surface and the one lead 29b is connected to the elongated portion thereof. Moreover, the dummy pole 26a is formed in the upper side of the monitoring element, and its elongated portion is connected to the lead 29a.

In this embodiment, the leads 16a and 16b connected to the both ends of the GMR layer 14 provided in the polished amount-monitoring element are connected to an external circuit. Therefore, the resistance change of the GMR layer is detected during the polish of the air bearing surface and the thus obtained data are employed in controlling the polished amount. However, the above connection of the leads to the external circuit is not required in this invention. That is, the present invention requires essentially that the edge position opposite to the air bearing surface of the dummy bottom pole chip 18a or the magnetic pole portion of the dummy bottom pole in the polished amount-monitoring element is separated from the standard position of the Throat Height zero by a given distance and the polish of the air bearing surface is stopped by detecting the discontinuation between the bottom pole chip and the bottom pole.

This invention has been described in detail with reference to the above preferred concrete embodiments, but it is obvious for the ordinary person skilled in the art that various modifications can be made in its configuration and detail without departing from the scope of this invention. For example, since the polished amount-monitoring element to monitor the polished amount of each bar having arranged plural combination type thin film magnetic head units with desired Throat Height and MR Height is not employed as the combination type thin film magnetic head, it is desired that each bar has fewer the polished amount-monitoring elements. However, since it is difficult to monitor the inclined degree of the polishing surface by only one polished amount-monitoring element and thus, the air bearing surface is not often formed precisely, it is desired that the polished amount-monitoring element is formed in the both ends of each bar and the nearby parts of the ends.

Moreover, according to the manufacturing method of a combination type thin film magnetic head of the present invention, since the formations of the magnetoresistive film and the polished amount-monitoring element are dependent each other, the stacking order between the writing thin film magnetic head and the reading thin film magnetic head is not restricted. That is, although in the above embodiment, the writing inductive type thin film magnetic head is formed above the reading magnetoresistive type thin film magnetic head, the reading thin film magnetic head may be formed on the writing thin film magnetic head.

As mentioned above, according to the manufacturing method of a combination type thin film magnetic head of the present invention, since the polished amount-monitoring element to monitor the polished amount of the air bearing surface is formed at the same time of the formation of the writing inductive type thin film magnetic head, the manufacturing method does not require a peculiar manufacturing process, not leading to the increase of the manufacturing cost.

Moreover, since the polished amount is monitored by detecting the continuation or discontinuation of the polished amount-monitoring element, not the continuous resistance change thereof, it can be controlled extremely precisely, so that the combination type thin film magnetic head having a desired Throat Height and the MR Height can be manufactured easily and precisely.

Furthermore, according to the wafer of the present invention, since the polished amount-monitoring element is formed in advance, the inductive type thin film magnetic head having a desired Throat Height can be obtained in completing the combination type thin film magnetic head. Particularly, in the case of forming plural polished amount-monitoring elements in advance, each having different distance to the edge of the dummy pole from the standard position of the Throat Height zero, the combination type thin film magnetic head with the inductive type thin film magnetic head having a desired Throat Height can be easily formed.

What is claimed is:

1. A method for manufacturing a combination-type thin film magnetic head in which a writing inductive-type thin film magnetic conversion element and a reading magnetoresistive-effective-type thin film magnetic conversion element are stacked on a surface of a wafer substrate and are magnetically and electrically insulated, comprising the steps of:

forming a first magnetic member comprising a first magnetic pole portion of an inductive-type thin film magnetic head;

forming a first electrode member for a polished amount-monitoring element of a same magnetic material as that of the first magnetic pole portion so that the first electrode member can have similar construction as that of the first magnetic pole portion and be formed simultaneous to the formation of the first magnetic pole portion either before or after forming the reading magnetoresistive-effective-type thin film magnetic conversion element on the wafer constituting the substrate;

forming a write gap layer so as to cover the first magnetic pole portion of the first magnetic member;

forming a thin film coil supported by an insulating layer on the first magnetic member and the first electrode member;

forming a second magnetic member comprising a second magnetic pole portion of the inductive-type thin film magnetic head;

forming a second electrode member for the polished amount-monitoring element of a same magnetic material as that of a second magnetic pole portion opposed to the first magnetic pole portion via the write gap layer and constituting a second magnetic member of the inductive-type thin film magnetic head, which is magnetically connected to the first magnetic member so that the second electrode member can have similar construction as that of the second magnetic pole portion, the second electrode member can be directly contacted with the first electrode member without the write gap layer and an inside edge, opposite to an air bearing surface of a joined surface between the first and second electrode members, the second electrode member can have a given position relative to a standard zero Throat Height position and be formed simultaneous to the formation of the second magnetic member;

forming first and second lead members connected to the first and the second electrode members for the polished amount-monitoring element respectively;

forming a magnetoresistive-effective-type thin film magnetic head on the surface of the same substrate;

cutting the wafer in plural bars so that each bar can have plural combination-type thin film magnetic head units and at least one polished amount-monitoring element after forming the writing inductive-type thin film magnetic conversion element and the reading magnetoresistive-effective-type thin film magnetic conversion element on the wafer substrate;

polishing ends of the bars while monitoring the polished amount of the air bearing surface of the combination-type thin film magnetic head by electrically detecting continuation and discontinuation between the first and second electrode members of the polished amount-monitoring element with a measuring circuit connected to the first and second lead members, and cutting each bar having plural combination-type thin film magnetic heads into individual heads, each head having its air bearing surface polished so as to obtain a desired Throat Height.

2. A method for manufacturing a combination type thin film magnetic head as defined in claim 1, wherein plural polished amount-monitoring elements, each having an equal distance to the standard position of the zero Throat Height from the inside edge opposite to the air bearing surface of the joined surface between the first and second electrode members, are formed on each bar.

3. A method for manufacturing a combination type thin film magnetic head as defined in claim 2, wherein the plural polished amount-monitoring elements are dispersedly formed in the plural combination type thin film magnetic head units in each bar.

4. A method for manufacturing a combination type thin film magnetic head as defined in claim 2, wherein at least two of the plural polished amount-monitoring elements, each having the equal distance to the standard position of the zero Throat Height from the inside edge opposite to the air bearing surface of the joined surface between the first and second electrode members, are formed near both ends of the bar.

5. A method for manufacturing a combination type thin film magnetic head as defined in claim 1, wherein plural polished amount-monitoring elements, each having a different distance to the standard position of the zero Throat Height from the inside edge opposite to the air bearing surface of the joined surface between the first and second electrode members, are formed on each bar.

6. A method for manufacturing a combination type thin film magnetic head as defined in claim 5, wherein the plural polished amount-monitoring elements are formed so that each element can have the different distance to the standard position of the zero Throat Height from the inside edge opposite to the air bearing surface of the joined surface between the first and second electrode members, the distance being in a range of 0.1–0.5 $\mu$m.

* * * * *